(12) United States Patent
Miyazaki et al.

(10) Patent No.: US 8,303,464 B2
(45) Date of Patent: Nov. 6, 2012

(54) VEHICULAR POWER TRANSMISSION CONTROL APPARATUS

(75) Inventors: Takeshige Miyazaki, Chiryu (JP);
Hiroki Hatori, Nishio (JP); Kan Sasaki,
Nagoya (JP); Toshio Tanba, Kariya (JP);
Yousuke Hayashi, Toyota (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 442 days.

(21) Appl. No.: 12/720,964

(22) Filed: Mar. 10, 2010

(65) Prior Publication Data

US 2010/0234173 A1    Sep. 16, 2010

(30) Foreign Application Priority Data

Mar. 11, 2009   (JP) .................................. 2009-57472

(51) Int. Cl.
*H02P 15/00*    (2006.01)
(52) U.S. Cl. .................. 477/8; 477/70; 477/97
(58) Field of Classification Search .................. 477/5, 7, 477/8, 70, 74, 80, 97
See application file for complete search history.

(56) References Cited

U.S. PATENT DOCUMENTS

| 6,155,954 | A  | * | 12/2000 | Itoyama et al. | ................... 477/5 |
| 2007/0197344 | A1 | * | 8/2007 | Kuepper | ........................ 477/74 |
| 2008/0039280 | A1 | * | 2/2008 | Petzold et al. | ................... 477/70 |

FOREIGN PATENT DOCUMENTS

JP    2000-224710 A1    8/2000

OTHER PUBLICATIONS

U.S. Appl. No. 12/754,931, filed Apr. 6, 2010, Tanba et al.
U.S. Appl. No. 12/754,946, filed Apr. 6, 2010, Hatori et al.
U.S. Appl. No. 12/720,940, filed Mar. 10, 2010, Tanba et al.
U.S. Appl. No. 12/720,956, filed Mar. 10, 2010, Miyazaki et al.
U.S. Appl. No. 12/720,979, filed Mar. 10, 2010, Miyazaki et al.
U.S. Appl. No. 12/720,984, filed Mar. 10, 2010, Miyazaki et al.

* cited by examiner

*Primary Examiner* — Justin Holmes
(74) *Attorney, Agent, or Firm* — Burr & Brown

(57) ABSTRACT

An apparatus comprises a changeover mechanism which is able to change a connection state of an electric motor output shaft to any one of states including, "an IN-Connection State" in which a power transmission path is provided between a transmission input shaft and the electric motor output shaft, "an OUT-Connection State" in which a power transmission path is provided between the transmission output shaft and the electric motor output shaft, and "a neutral connection state" in which no transmission path therebetween is provided. The changeover is carried out based on a combination (area) of a vehicle speed V and a required driving torque T. As for the changeover, an IN-connection area, in which an electric-motor-driving-wheels-maximum-torque is larger than in an OUT-Connection State and in a neutral connection area, is enlarged.

10 Claims, 9 Drawing Sheets

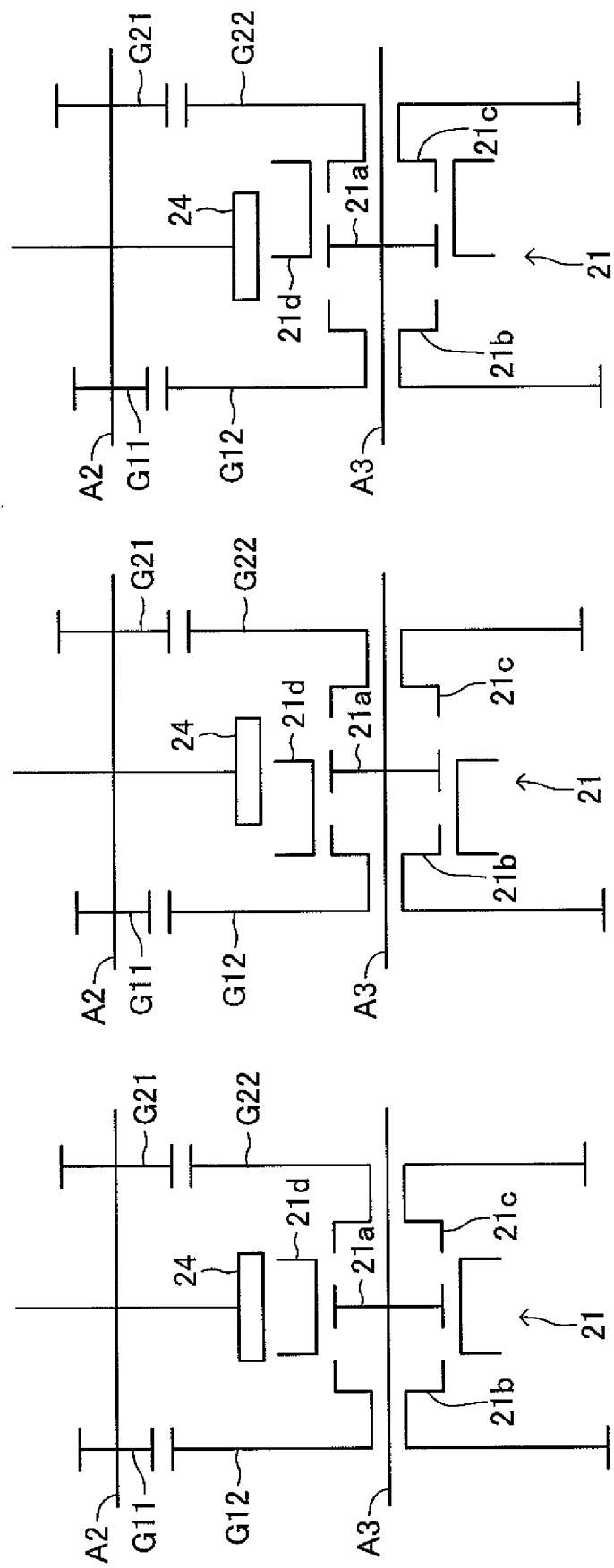

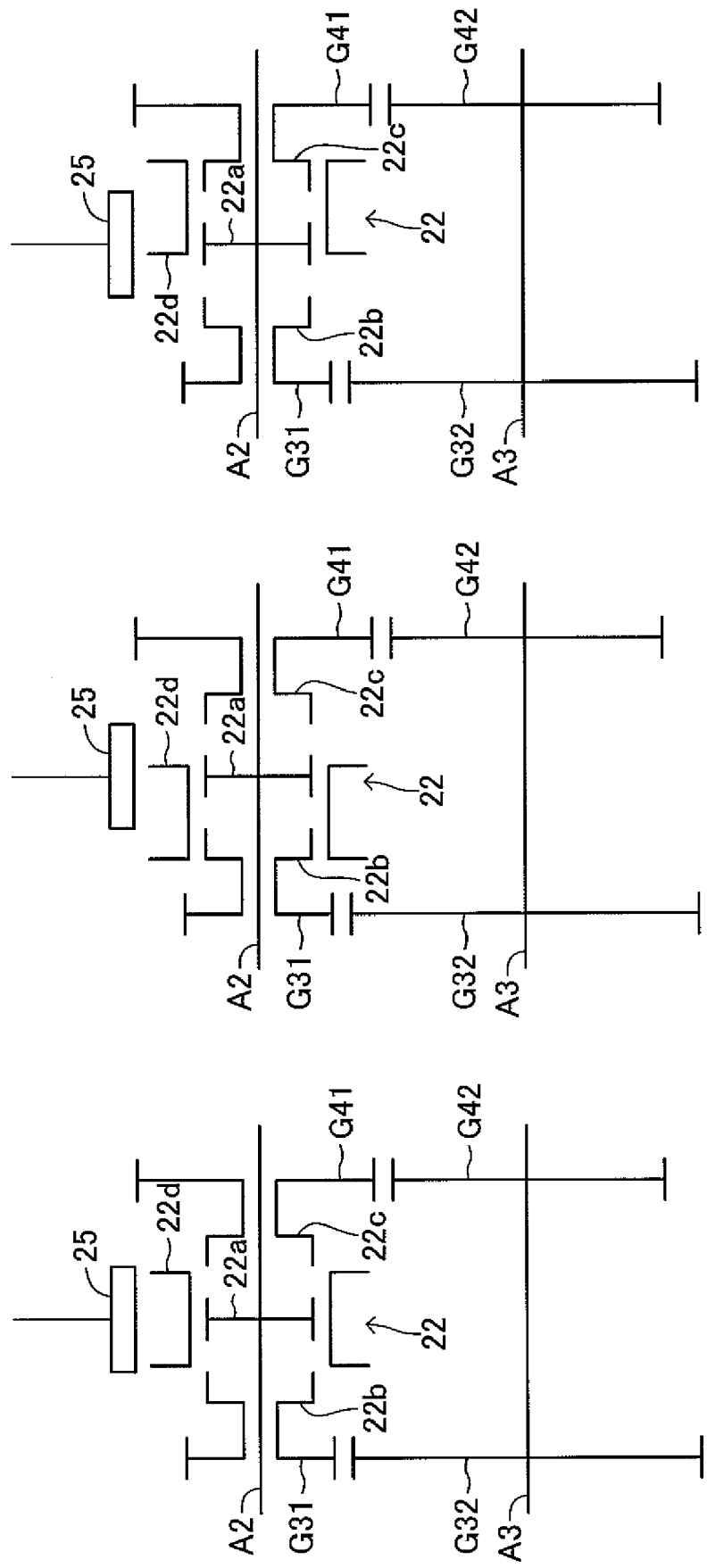

non-connection (neutral)

5th gear position connection

VEHICULAR POWER TRANSMISSION CONTROL APPARATUS

BACKGROUND OF THE INVENTION

1. Field of the Invention

The present invention relates to a vehicular power transmission control apparatus, especially to a vehicular power transmission control apparatus applied to a vehicle comprising an internal combustion engine and an electric motor as power sources.

2. Description of the Related Art

In these days, a so-called hybrid vehicle comprising an internal combustion engine and an electric motor (electric motor generator) as power sources has been developed (refer to, for example, Japanese Unexamined Patent Application Publication No. 2000-224710). In the hybrid vehicle, the electric motor is used as the power source generating a driving torque for driving the vehicle together with the internal combustion engine or by itself, or is used as a power source for starting the internal combustion engine.

Further, the electric motor is used as an electric motor generator for generating a regeneration torque to provide a breaking force to the vehicle, or is used as an electric motor generator for generating an electric power which is supplied to and stored in a battery of the vehicle. These usages of the electric motor can improve a total energy efficiency (fuel consumption) of the vehicle as a whole.

SUMMARY OF THE INVENTION

In the meanwhile, in the hybrid vehicle, there is a case where a connection state (hereinafter, referred to as an "IN-Connection State") is used in which a power transmission path between an output shaft of the electric motor and an input shaft of a transmission is provided, and there is another case where another connection state (hereinafter, referred to as an "OUT-Connection State") is used in which a power transmission path between the output shaft of the electric motor and an output shaft of the transmission (and thus, driving wheels) is provided without involving the transmission.

In the "IN-Connection State", a rotational speed of the output shaft of the electric motor with respect to a vehicle speed can be varied by changing a gear position of the transmission. Accordingly, adjusting the gear position of the transmission can provide an advantage such that the rotational speed of the output shaft of the electric motor can easily be maintained within a range in which an energy conversion efficiency (more specifically, an efficiency in generating the driving torque, the regeneration torque, or the like) is high.

On the other hand, the "OUT-Connection State" provides an advantage such that a power transfer loss can be made smaller, since the power transmission path does not involve the transmission having a complicated mechanism. In addition, in the transmission (especially, in a transmission of a type which does not include a torque converter), a power transmission from the input shaft of the transmission to the output shaft of the transmission is generally shut off temporarily during a gear position shifting operation (during an operation in which the gear position is changed). Consequently, a rapid change in an acceleration in a front-rear direction of the vehicle (so-called shift shock) tends to occur. However, the "OUT-Connection State" allows the driving torque from the electric motor to be continuously transmitted to the output shaft of the transmission (and therefore to the drive wheels) even during the gear position shifting operation, and therefore provides an advantage such that the shift shock is suppressed.

In view of the above, the assignee of the present invention has already proposed a changeover mechanism which can change/switch a connection state of the output shaft of the electric motor between the IN-Connection State and the OUT-Connection State, in Japanese Patent Application No. 2007-271556. The changeover mechanism can further change the connection state of the output shaft of the electric motor to a state in which neither a power transmission path between the output shaft of the electric motor and the input shaft of the transmission nor a power transmission path between the output shaft of the electric motor and the output shaft of the transmission is provided. Hereinafter, this state is referred to as a "non-connection state".

In the meanwhile, when the vehicle is running, a resistance (hereinafter, referred to as "a running resistance") to decelerate the vehicle due to the running occurs. The running resistance may be defined as a total sum of a frictional resistance of each of various rotational members included in a driving system, a resistance to decelerate the vehicle due to a wind generated with the running of the vehicle, and a resistance to decelerate the vehicle due to an inclination of a road, and so on.

When the running resistance is large while the vehicle is running, it is preferable that a maximum value (hereinafter, referred to as an "electric-motor-driving-wheels-maximum-torque") of a driving torque which is generated by the electric motor and which is transmitted to the output shaft of the transmission (and accordingly to drive wheels) be set at a larger value. On the other hand, the electric-motor-driving-wheels-maximum-torque varies depending on the connection state of the output shaft of the electric motor.

More specifically, the electric-motor-driving-wheels-maximum-torque is retained at zero under the non-connection state. Accordingly, the electric-motor-driving-wheels-maximum-torque is greater under/in the IN-Connection State or under/in the OUT-Connection State than under/in the non-connection state. Further, the electric-motor-driving-wheels-maximum-torque under the IN-Connection State may be different from the electric-motor-driving-wheels-maximum-torque under the OUT-Connection State. The reason for this is as follows.

A product of "a ratio (first reduction ratio) of the rotational speed of the output shaft of the electric motor to the rotational speed of the input shaft of the transmission under the IN-Connection State" and "a reduction ratio of the transmission (transmission reduction ratio)" is defined as an "IN-connection reduction ratio". A ratio of the rotational speed of the output shaft of the electric motor to the rotational speed of the output shaft of the transmission under the OUT-connection State is defined as an "OUT-connection reduction ratio". As described above, the IN-connection reduction ratio varies in accordance with a change in the reduction ratio of the transmission. On the other hand, the OUT-connection reduction ratio is maintained at a constant irrespective of the reduction ratio of the transmission. Accordingly, a magnitude relation between the IN-connection reduction ratio and the OUT-connection reduction ratio may change in accordance with the reduction ratio of the transmission. That is, the IN-connection reduction ratio and the OUT-connection reduction ratio may be different from each other.

When the IN-connection reduction ratio is larger (smaller) than the OUT-connection reduction ratio, the rotational speed of the output shaft of the electric motor becomes larger (smaller) under the IN-Connection State than under the OUT- Connection State (in a case where the vehicle speed is constant). Further, the maximum torque which the electric motor can generate becomes smaller as the rotational speed of the output shaft of the electric motor becomes larger (refer to FIG. 5 described later). Accordingly, when the IN-connection reduction ratio is larger (smaller) than the OUT-connection reduction ratio (in the case where the vehicle speed is constant), the maximum torque which the electric motor can generate becomes larger (smaller) under the OUT-Connection State than under the IN-Connection State. That is, when the IN-connection reduction ratio and the OUT-connection reduction ratio are different from each other (in a case where the vehicle speed is constant), the maximum torque which the electric motor can generate under the IN-Connection State is different from the maximum torque which the electric motor can generate under the OUT-Connection State.

(In a case where the vehicle speed is constant), the electric-motor-driving-wheels-maximum-torque under the IN-Connection State corresponds to a value (hereinafter, referred to as an "IN-connection maximum driving torque") obtained by multiplying "a maximum driving torque of the output shaft of the electric motor with respect to the rotational speed of the electric motor under the IN-Connection State" by "the IN-connection reduction ratio", and the electric-motor-driving-wheels-maximum-torque under the OUT-Connection State corresponds to a value (hereinafter, referred to as an "OUT-connection maximum driving torque") obtained by multiplying "a maximum driving torque of the output shaft of the electric motor with respect to the rotational speed of the electric motor under the OUT-Connection State" by "the OUT-connection reduction ratio". It is understood from the above description that the electric-motor-driving-wheels-maximum-torque under the IN-Connection State may be different from the electric-motor-driving-wheels-maximum-torque under the OUT-Connection State, when the IN-connection reduction ratio and the OUT-connection reduction ratio are different from each other.

In view of the above, when the running resistance is large, it is considered to be preferable that "a time period in which a connection state in which the electric-motor-driving-wheels-maximum-torque is larger is selected as an actual connection state of the output shaft of the electric motor" be lengthen.

An object of the present invention is therefore to provide a vehicular power transmission control apparatus applied to a vehicle comprising an internal combustion engine and an electric motor as power sources, the control apparatus being able to select an appropriate connection state of an output shaft of the electric motor to thereby appropriately adjust the electric-motor-driving-wheels-maximum-torque.

The vehicular power transmission control apparatus according to the present invention comprises a transmission, a changeover mechanism, running-resistance-correlating-value obtaining means, and control means. Each of them will be described hereinafter.

The transmission comprises: an input shaft to provide/realize a power transmission path between the input shaft of the transmission and an output shaft of the internal combustion engine; and an output shaft to provide/realize a power transmission path between the output shaft of the transmission and drive wheels of the vehicle. The transmission is configured so as to be able to adjust a ratio (transmission reduction ratio) of a rotational speed of the input shaft of the transmission to a rotational speed of the output shaft of the transmission. It should be noted that the transmission may be a multiple gear ratio transmission which can realize each of a plurality of predetermined reduction ratios different from one another as the transmission reduction ratio, or may be a continuously variable transmission which can continuously (in a non-stepwise fashion) adjust a reduction ratio as the transmission reduction ratio.

Further, the transmission may be "a multiple gear ratio transmission or a continuously variable transmission (so-called automatic transmission (AT))" comprising a torque converter and being configured in such a manner that the gear position shifting operation is automatically performed in accordance with a vehicle driving condition, or may be "a multiple gear ratio transmission without the torque converter (so-called manual transmission (MT))". If the transmission is the manual transmission, the transmission may be, but not limited to, any one of the following types.

A type in which the gear position shifting operation is performed directly by a force applied to a shift lever from a driver.

A type in which the gear position shifting operation is performed by a drive force generated by an actuator which is driven in response to a signal indicative of a position of the shift lever which the driver operates.

A type in which the gear position shifting operation can be automatically performed by a drive force generated by an actuator which is automatically driven in accordance with the vehicle driving condition, without depending on an operation of the shift lever by the driver (i.e., a so-called automated manual transmission).

The changeover mechanism can change a connection state of the output shaft of the electric motor to any one from two or more states comprising, an input-side-connection state (IN-Connection State) in which a power transmission path is provided between the output shaft of the electric motor and the input shaft of the transmission, an output-side-connection state (OUT-Connection State) in which a power transmission path is provided between the output shaft of the electric motor and the drive wheels without involving the transmission, and a non-connection state in which neither a power transmission path between the output shaft of the electric motor and the input shaft of the transmission, nor a power transmission path between the output shaft of the electric motor and the output shaft of the transmission (i.e., the drive wheels) is provided. The changeover mechanism realizes any one out of the two or more states described above. That is, the changeover mechanism may be but not limited to one of the followings.

A changeover mechanism which can change the connection state of the output shaft of the electric motor into any one of the IN-Connection State and the OUT-Connection State, only (i.e. which can realize any one from alternatives consisting of the IN-Connection State and the OUT-Connection State, only).

A changeover mechanism which can change the connection state of the output shaft of the electric motor into any one of the IN-Connection State and the non-connection state, only (i.e. which can realize any one from the IN-Connection State and the non-connection state, only).

A changeover mechanism which can change the connection state of the output shaft of the electric motor into any one of the OUT-Connection State and the non-connection state, only (i.e. which can realize any one from the OUT-Connection State and the non-connection state, only).

A changeover mechanism which can change the connection state of the output shaft of the electric motor into any one of the IN-Connection State, the OUT-Connection State, and the non-connection state (i.e. which can realize any one from the IN-Connection State, the OUT-connection state, and the non-connection state).

In the IN-Connection State, the ratio (first reduction ratio) of the rotational speed of the output shaft of the electric motor to the rotational speed of the input shaft of the transmission is generally fixed to a constant (e.g., 1). As described above, the product of "the first reduction ratio" and "the transmission reduction ratio" under the In-Connection State is defined as the "IN-connection reduction ratio". In the meantime, the ratio of the rotational speed of the output shaft of the electric motor to the rotational speed of the output shaft of the transmission in the OUT-Connection State is defined as the "OUT-connection reduction ratio". Typically, the OUT-connection reduction ratio may be a constant such as a value larger than 1 and the transmission reduction ratio corresponding to a 2nd gear position, and the like. It should be noted that a ratio of the rotational speed of the output shaft of the internal combustion engine to the rotational speed of the input shaft of the transmission is generally set at a constant (e.g., 1).

The running-resistance-correlating-value obtaining means obtains a running-resistance-correlating-value correlating with a running resistance which is a resistance to decelerate the vehicle caused by (due to) a running of the vehicle. As described above, the running resistance can be defined as the total sum of the frictional resistance of each of the various rotational members included in the driving system, the resistance to decelerate the vehicle due to the wind generated with the running of the vehicle, and the resistance to decelerate the vehicle due to the inclination of the road, and so on, for example. The running resistance can be positive or negative. When the running resistance is positive (negative), the vehicle receives a force which decelerates (accelerates) the vehicle by the running resistance. For example, the running resistance can be negative when the vehicle is running on a descent (downslope).

For example, the running-resistance-correlating-value can be obtained based on:
- a driving torque, transmitted to the drive wheels of the vehicle, which is generated by the internal combustion engine;
- a driving torque, transmitted to the drive wheels of the vehicle, which is generated by the electric motor;
- a mass of the vehicle;
- an acceleration of the vehicle; and
- a motion equation for the vehicle, which expresses that a force in a direction of acceleration of the vehicle given to the vehicle is equal to a product of the mass of the vehicle and the acceleration of the vehicle.

The acceleration of the vehicle can be obtained, for example, by differentiating a vehicle speed calculated based on an output of a sensor detecting a wheel speed with respect to time, or can be obtained from an output of a sensor detecting an acceleration in the front-rear direction of the vehicle.

Further, the running-resistance-correlating-value can be obtained based on an inclination of a road on which the vehicle is running. The inclination of the road can be obtained based on, for example, road-information provided by a car navigation system mounted on the vehicle and a current position of the vehicle obtained from a global positioning system mounted on the vehicle. Alternatively, the inclination of the road can be calculated by processing an image of the road which a camera mounted on the vehicle provides.

The control means selects a (target) connection state of the output shaft of the electric motor (from the connection states which said changeover means can realize), based on the running-resistance-correlating-value and "a parameter indicative of a running condition of the vehicle" other than the running-resistance-correlating-value, in such a manner that a possibility of selecting, (as the target connection state), a connection state (from the connection states which the changeover means can realize) in which a maximum value of a driving torque which is generated by the electric motor and which can be transmitted to the output shaft of the transmission is greater (than in the rest of the connection states), becomes higher, as the running resistance is larger. In other words, an ease by which a connection state which allows electric motor to generate a greater maximum value of a driving torque compared to the rest of the connection state(s) is selected is increased, as the running resistance is larger. The control means controls the changeover means in such a manner that an actual connection state of the output shaft of the electric motor coincides with the selected connection state (as the target connection state).

Examples of the parameter indicative of the running condition of the vehicle include a value correlating with the vehicle speed (speed of the vehicle), a value correlating with a required driving torque obtained based on an operation of an acceleration operating member by the driver of the vehicle, and so on. Examples of the value correlating with the vehicle speed include the vehicle speed itself, the rotational speed of the input shaft of the transmission, the rotational speed of the output shaft of the internal combustion engine, and the rotational speed of the output shaft of the electric motor, and so on. Examples of the value correlating with the required driving torque include an operating amount of the acceleration operating member and an opening degree of a throttle valve disposed in an intake passage of the internal combustion engine.

According to the configuration described above, "the connection state in which the electric-motor-driving-wheels-maximum-torque is larger" is more easily selected as the running resistance is larger. Accordingly, when the running resistance is high, a time period, in which "the connection state which can provide larger electric-motor-driving-wheels-maximum-torque" is selected, lengthens (that is, "the connection state where the electric-motor-driving-wheels-maximum-torque is larger" is selected more frequently). As a result, a time period in which the electric-motor-driving-wheels-maximum-torque is large lengthens, and the vehicle is thereby accelerated more efficiently.

More specifically, the control means is preferably configured so as to adjust a threshold in such a manner that the threshold becomes larger as the running resistance is larger, in a case where it changes an actual connection state of the output shaft of the electric motor from the IN-Connection State to the OUT-Connection State when the value correlating with the vehicle speed passes over the threshold while the value is increasing, if "the IN-connection maximum driving torque" is (configured so as to be) larger than "the OUT-connection maximum driving torque". According to the configuration described above, during the vehicle speed is increasing, a timing at which the changeover (shifting) from "the IN-Connection State" to "the OUT-Connection State" is carried out is more delayed as the running resistance is larger. That is, a time period lengthens in which the IN-Connection State in which the electric-motor-driving-wheels-maximum-torque is larger compared to the OUT-Connection State is selected. Consequently, the vehicle can be accelerated more efficiently, when the running resistance is large. On the other hand, if "the IN-connection maximum driving torque" is (configured so as to be) smaller than "the OUT-connection maximum driving torque", it is preferable that the threshold be adjusted in such a manner that the threshold becomes smaller as the running resistance is larger. According to the configuration described above, during the vehicle speed is increasing, a timing at which the changeover (shifting) from "the IN-Connection State" to "the OUT-Connection State" is carried out comes earlier as the running resistance is larger. That is, a time period lengthens in which the OUT-Connection State in which the electric-motor-driving-wheels-maximum-torque is larger compared to the IN-Connection State is selected. Consequently, the vehicle can be accelerated more efficiently, when the running resistance is large.

Further, the control means is preferably configured so as to adjust a threshold in such a manner that the threshold becomes smaller (larger) as the running resistance is larger, in a case where it changes an actual connection state of the output shaft of the electric motor from the OUT-Connection State to the IN-Connection State when the value correlating with the vehicle speed passes over the threshold while the value is increasing, if "the OUT-connection maximum driving torque" is smaller (larger) than "the IN-connection maximum driving torque". This can also lengthen a time period in which one of the IN-Connection State and the OUT-Connection State is selected, wherein the electric-motor-driving-wheels-maximum-torque in the selected State is larger than in the other State. Consequently, the vehicle can be accelerated more efficiently, when the running resistance is large.

Further, in a case where the control means changes the actual connection state of the output shaft of the electric motor from either one of the IN-Connection State and the OUT-Connection State to the non-connection state, when the value correlating with the vehicle speed passes over a threshold while the value is increasing, the control means is preferably configured so as to adjust the threshold in such a manner that the threshold becomes larger as the running resistance is larger. As described above, the electric-motor-driving-wheels-maximum-torque is maintained at 0 under "the non-connection state", and the electric-motor-driving-wheels-maximum-torque under "the IN-Connection State" or under "the OUT-Connection State" is therefore larger compared to "the non-connection state". According to this configuration, during the vehicle speed is increasing, a timing at which the changeover (shifting) from either one of "the IN-Connection State" and "the OUT-Connection State" to "the non-connection state" is carried out is more delayed as the running resistance is larger. That is, the configuration lengthens a time period in which one of the IN-Connection State and the OUT-Connection State, in which the electric-motor-driving-wheels-maximum-torque is larger compared to the non-connection state, is selected. Consequently, the vehicle can be accelerated more efficiently, when the running resistance is large.

Further, in a case where the control means changes the actual connection state of the output shaft of the electric motor from either one of the IN-Connection State and the OUT-Connection State to the non-connection state, when a value correlating with the required driving torque obtained based on an operation applied to an acceleration operating member by the driver of the vehicle passes over a threshold while the value is increasing, the control means is preferably configured so as to adjust the threshold in such a manner that the threshold becomes larger as the running resistance is larger. This configuration also lengthens a time period in which one of the IN-Connection State and the OUT-Connection State, in which the electric-motor-driving-wheels-maximum-torque is larger compared to the non-connection state, is selected. Consequently, the vehicle can be accelerated more efficiently, when the running resistance is large.

Further, the control means is preferably configured so as to:
select, as the actual connection state of the output shaft of the electric motor, the input-side-connection state (IN-Connection State) when the vehicle stars to drive;
change the actual connection state of the output shaft of the electric motor from the IN-Connection State (hereinafter, referred to as a "first IN-Connection State") to the OUT-Connection State, when the value correlating with a speed of the vehicle passes over a first threshold while the value correlating with a speed of the vehicle is increasing;
change the actual connection state of the output shaft of the electric motor from the OUT-Connection State to the IN-Connection State (hereinafter, referred to as a "second IN-Connection State"), when the value correlating with a speed of the vehicle passes over a second threshold larger than the first threshold while the value correlating with a speed of the vehicle is increasing;
change the actual connection state of the output shaft of the electric motor from the (second) IN-Connection State to the non-connection state, when the value correlating with a speed of the vehicle passes over a third threshold larger than the second threshold while the value correlating with a speed of the vehicle is increasing in a period in which the value correlating with the required driving torque is larger than a fourth threshold, or when the value correlating with the required driving torque passes over the fourth threshold while the value correlating with the required driving torque is increasing in a period in which the value correlating with a speed of the vehicle is larger than the third threshold.

Here, in a case where "the IN-connection maximum driving torque" is larger than "the OUT-connection maximum driving torque" when changing from the first IN-Connection State to the OUT-Connection State, and "the OUT-connection maximum driving torque" is smaller than "the IN-connection maximum driving torque" when changing from the OUT-Connection State to the (second) IN-Connection State, the control means is preferably configured so as to adjust the first threshold and the second threshold in such a manner that the first threshold becomes larger and the second threshold becomes smaller, as the running resistance is larger.

It should be noted that each of the first, second, and third thresholds may be a value varying depending on the required driving torque, or a constant. The fourth threshold may be a value varying depending on the speed of the vehicle, or a constant.

According to the configuration described above, while the vehicle speed is increasing, a timing at which the changeover (shifting) from "the (first) IN-Connection State" to "the OUT-Connection State" is carried out is more delayed as the running resistance is larger, and a timing at which the changeover (shifting) from "the OUT-Connection State" to "the (second) IN-Connection State" is carried out comes earlier as the running resistance is larger. That is, a time period in which the first and second IN-Connection States where the electric-motor-driving-wheels-maximum-torque is larger compared to the OUT-Connection State is selected lengthens. Consequently, the vehicle can be accelerated more efficiently, when the running resistance is large.

In this case, the control means is preferably configured so as to adjust at least one of the third threshold and the fourth threshold in such a manner that the third threshold becomes larger as the running resistance is larger and the fourth threshold becomes larger as the running resistance is larger. According to the configuration, while the vehicle speed is increasing, a timing at which the changeover (shifting) from "the (second) IN-Connection State" to "the non-connection state" is carried out is more delayed as the running resistance is larger, or while the required driving torque is increasing, a timing at which the changeover (shifting) from "the (second) IN-Connection State" to "the non-connection state" is carried out is more delayed as the running resistance is larger. That is, a time period in which the second IN-Connection States where the electric-motor-driving-wheels-maximum-torque is larger compared to the non-connection state is selected lengthens. Consequently, the vehicle can be accelerated more efficiently, when the running resistance is large.

It is preferable that the vehicular power transmission control apparatus according to the present invention be applied to the automated manual transmission described above. In this case, a clutch mechanism is provided between the output shaft of the internal combustion engine and the input shaft of the transmission. The clutch mechanism can shut or provide a power transmission path between the output shaft of the internal combustion engine and the input shaft of the transmission. In addition, in this case, the transmission does not comprise the torque converter, but is the multiple gear ratio transmission which can realize any one of a plurality of predetermined reduction ratios different from one another as the transmission reduction ratio. Further, the control means is configured so as to control, based on the driving condition (e.g., the vehicle speed and the required driving torque) of the vehicle, shutting and providing of the power transmission path by the clutch mechanism, and so as to control the transmission reduction ratio (the gear position).

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 2A is a schematic view showing one of three states which the first changeover mechanism in the transmission shown in FIG. 1 can realize;

FIG. 2B is a schematic view showing one of three states which the first changeover mechanism in the transmission shown in FIG. 1 can realize;

FIG. 2C is a schematic view showing one of three states which the first changeover mechanism in the transmission shown in FIG. 1 can realize;

FIG. 3A is a schematic view showing one of three states which the second changeover mechanism in the transmission shown in FIG. 1 can realize;

FIG. 3B is a schematic view showing one of three states which the second changeover mechanism in the transmission shown in FIG. 1 can realize;

FIG. 3C is a schematic view showing one of three states which the second changeover mechanism in the transmission shown in FIG. 1 can realize;

DESCRIPTION OF THE PREFERRED EMBODIMENTS

Next will be described embodiments of a vehicular power transmission control apparatus according to the present invention with reference to the drawings.
(Configuration)

Figure 1:
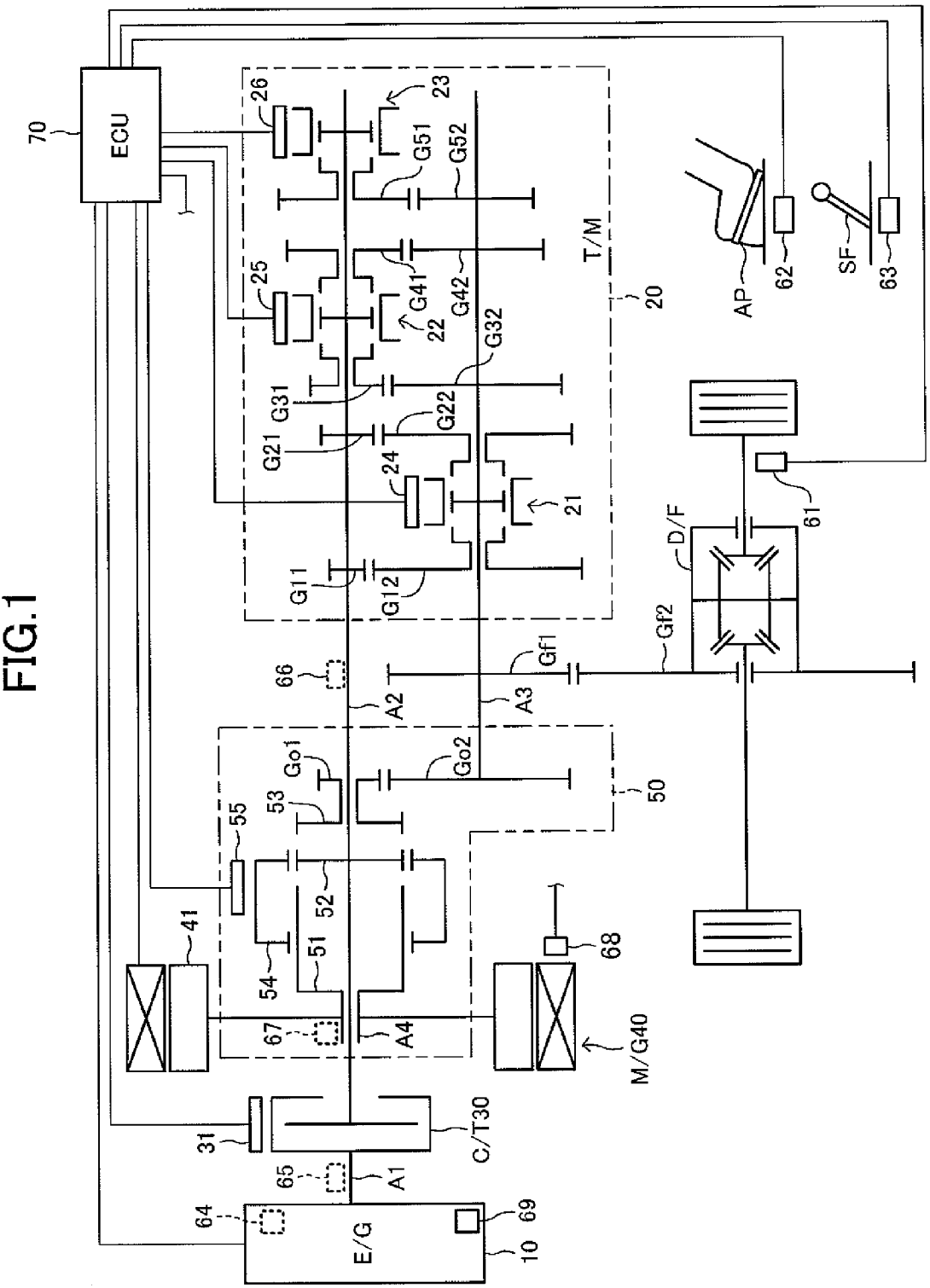
FIG. 1 is a schematic view of a vehicle which mounts a vehicular power transmission control apparatus according to an embodiment of the present invention.

FIG. 1 shows a schematic configuration of a vehicle mounting a vehicular power transmission control apparatus (hereinafter, referred to as a "present apparatus") according to an embodiment of the present invention. The present apparatus is applied to the vehicle comprising, as its power sources, an internal combustion engine and a motor generator. The vehicle comprises a so-called automated manual transmission, which uses a multiple gear ratio transmission, but which does not have a torque converter.

The vehicle comprises the engine (E/G) 10, the transmission (T/M) 20, a clutch (C/T) 30, the motor generator (M/G) 40, and a changeover mechanism 50. The E/G 10 is one of well-known internal combustion engines, including a gasoline engine which uses a gasoline as a fuel and a diesel engine which uses a light diesel oil as a fuel. An output shaft A1 of the E/G 10 is connected to an input shaft A2 of the T/M 20 through the C/T 30.

The T/M 20 is one of well-known multiple gear ratio transmission. The T/M 20 has five gear positions (a 1st, a 2nd, a 3rd, a 4th, and a 5th positions) as forward gear positions. The T/M 20 does not comprise a torque convertor. That is, the T/M 20 can set a transmission reduction ratio Gtm at any one of five ratios. The transmission reduction ratio Gtm is a ratio of a rotational speed of the input shaft A2 to a rotational speed of an output shaft A3. The gear positions are changed/shifted by controlling a first, a second, and a third changeover mechanisms 21, 22, and 23.

More specifically, as shown in FIG. 2, the first changeover mechanism 21 comprises a gear G11 axially supported by and rotatably immovable relative to the input shaft A2, a gear G12 axially supported by and rotatably movable relative to the output shaft A3 so as to always mesh with the gear G11, a gear G21 axially supported by and rotatably immovable relative to the input shaft A2, and a gear G22 axially supported by and rotatably movable relative to the output shaft A3 so as to always mesh with the gear G21. Further, the first changeover mechanism 21 comprises a connection piece 21a which rotates integrally with the output shaft A3, a connection piece 21b which rotates integrally with the gear G12, a connection piece 21c which rotates integrally with the gear G22, a sleeve 21d, and an actuator 24.

The sleeve 21d is provided so as to be movable in an axial direction of the output shaft A3. A position of the sleeve 21d along the axial direction is controlled by the actuator 24. The sleeve 21d is able to be spline-engaged with the connection pieces 21a, 21b, and 21c. When the sleeve 21d is at a non-connection position (neutral position) shown in FIG. 2A, the sleeve 21d spline-engages only with the connection piece 21a, and both of the gears G12 and G22 are therefore rotatably movable relative to the output shaft A3. When the sleeve 21d is at a 1st-gear-position-connection position shown in FIG. 2B, the sleeve 21d spline-engages with the connection pieces 21a and 21b. Accordingly, the gear G12 is rotatably immovable relative to the output shaft A3, whereas the gear G22 is rotatably movable relative to the output shaft A3. When the sleeve 21d is at a 2nd-gear-position-connection position shown in FIG. 2C, the sleeve 21d spline-engages with the connection pieces 21a and 21c. Accordingly, the gear G22 is rotatably immovable relative to the output shaft A3, whereas the gear G12 is rotatably movable relative to the output shaft A3.

As shown in FIGS. 3A to 3C, the second changeover mechanism 22 comprises a gear G31 axially supported by and rotatably movable relative to the input shaft A2, a gear G32 axially supported by and rotatably immovable relative to the output shaft A3 so as to always mesh with the gear G31, a gear G41 axially supported by and rotatably movable relative to the input shaft A2, and a gear G42 axially supported by and rotatably immovable relative to the output shaft A3 so as to always mesh with the gear G41. Further, the second changeover mechanism 22 comprises a connection piece 22a which rotates integrally with the input shaft A2, a connection piece 22b which rotates integrally with the gear G31, a connection piece 22c which rotates integrally with the gear G41, a sleeve 22d, and an actuator 25.

The sleeve 22d is provided so as to be movable in an axial direction of the input shaft A2. A position of the sleeve 22d along the axial direction is controlled by the actuator 25. The sleeve 22d is able to spline-engage with the connection pieces 22a, 22b, and 22c. When the sleeve 22d is at a non-connection position (neutral position) shown in FIG. 3A, the sleeve 22d spline-engages only with the connection piece 22a, and both of the gears G31 and G41 are therefore rotatably movable relative to the input shaft A2. When the sleeve 22d is at a 3rd-gear-position-connection position shown in FIG. 3B, the sleeve 22d spline-engages with the connection pieces 22a and 22b. Accordingly, the gear G31 is rotatably immovable relative to the input shaft A2, whereas the gear G41 is rotatably movable relative to the input shaft A2. When the sleeve 22d is at a 4th-gear-position-connection position shown in FIG. 3C, the sleeve 22d spline-engages with the connection pieces 22a and 22c. Accordingly, the gear G41 is rotatably immovable relative to the input shaft A2, whereas the gear G31 is rotatably movable relative to the input shaft A2.

Figure 4A:
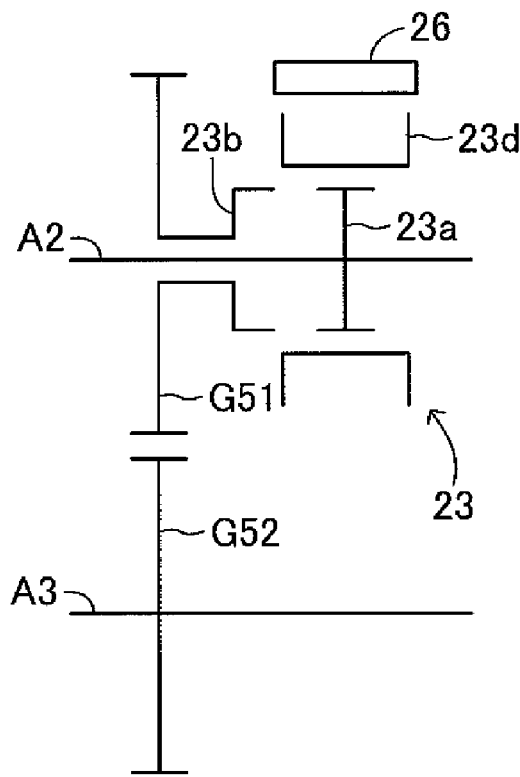
FIG. 4A is a schematic view showing one of two states which the third changeover mechanism in the transmission shown in FIG. 1 can realize.
Figure 4B:
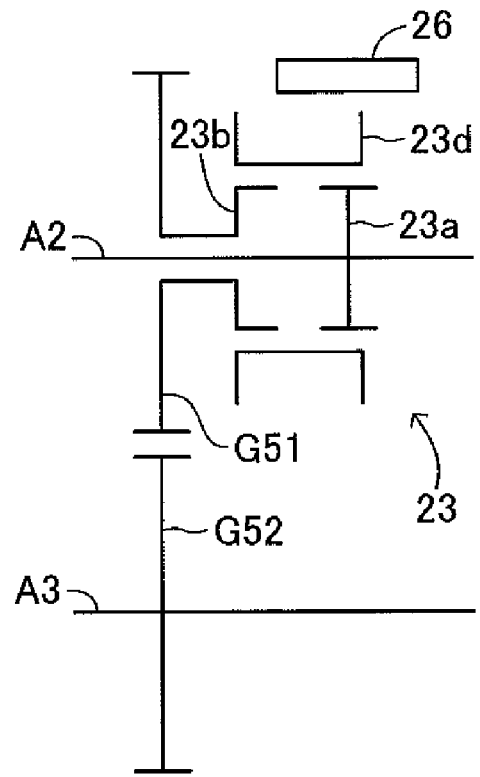
FIG. 4B is a schematic view showing one of two states which the third changeover mechanism in the transmission shown in FIG. 1 can realize.

As shown in FIGS. 4A and 4B, the third changeover mechanism 23 comprises a gear G51 axially supported by and rotatably movable relative to the input shaft A2, a gear G52 axially supported by and rotatably immovable relative to the output shaft A3 so as to always mesh with the gear G51. Further, the third changeover mechanism 23 comprises a connection piece 23a which rotates integrally with the input shaft A2, a connection piece 23b which rotates integrally with the gear G51, a sleeve 23d, and an actuator 26.

The sleeve 23d is provided so as to be movable in the axial direction of the input shaft A2. A position of the sleeve 23d along the axial direction is controlled by the actuator 26. The sleeve 23d is able to spline-engage with the connection pieces 23a and 23b. When the sleeve 23d is at a non-connection position (neutral position) shown in FIG. 4A, the sleeve 23d spline-engages only with the connection piece 23a, and the gears G51 is therefore rotatably movable relative to the input shaft A2. When the sleeve 23d is at a 5th-gear-position-connection position shown in FIG. 4B, the sleeve 23d spline-engages with the connection pieces 23a and 23b. Accordingly, the gear G51 is rotatably immovable relative to the input shaft A2.

When the gear position is set at "the 1st gear position", the changeover mechanisms 21, 22, and 23 are controlled to "the 1st-gear-position-connection position", "the neutral position", and "the neutral position", respectively. Consequently, a power transmission path is provided/realized between the input shaft A2 and the output shaft A3 through the gears G11, and G12, and the transmission reduction ratio Gtm becomes equal to (the number of teeth of the gear G12)/(the number of teeth of the gear G11). This value is also expressed as Gtm(1). When the gear position is set at "the 2nd gear position", the changeover mechanisms 21, 22, and 23 are controlled to "the 2nd-gear-position-connection position", "the neutral position", and "the neutral position", respectively. Consequently, a power transmission path is provided/realized between the input shaft A2 and the output shaft A3 through the gears G21, and G22, and the transmission reduction ratio Gtm becomes equal to (the number of teeth of the gear G22)/(the number of teeth of the gear G21). This value is also expressed as Gtm(2).

When the gear position is set at "the 3rd gear position", the changeover mechanisms 21, 22, and 23 are controlled to "the neutral position", "the 3rd-gear-position-connection position", and "the neutral position", respectively. Consequently, a power transmission path is provided/realized between the input shaft A2 and the output shaft A3 through the gears G31, and G32, and the transmission reduction ratio Gtm becomes equal to (the number of teeth of the gear G32)/(the number of teeth of the gear G31). This value is also expressed as Gtm(3). When the gear position is set at "the 4th gear position", the changeover mechanisms 21, 22, and 23 are controlled to "the neutral position", "the 4th-gear-position-connection position", and "the neutral position", respectively. Consequently, a power transmission path is provided/realized between the input shaft A2 and the output shaft A3 through the gears G41, and G42, and the transmission reduction ratio Gtm becomes equal to (the number of teeth of the gear G42)/(the number of teeth of the gear G41). This value is also expressed as Gtm(4).

When the gear position is set at "the 5th gear position", the changeover mechanisms 21, 22, and 23 are controlled to "the neutral position", "the neutral position", and "the 5th-gear-position-connection position", respectively. Consequently, a power transmission path is provided/realized between the input shaft A2 and the output shaft A3 through the gears G51, and G52, and the transmission reduction ratio Gtm becomes equal to (the number of teeth of the gear G52)/(the number of teeth of the gear G51). This value is also expressed as Gtm(5). In this manner, in the T/M 20, the actuators 24, 25, and 26 are controlled so that the transmission reduction ratio Gtm can be set at one of the five reduction ratios. Here, a relation Gtm(1)>Gtm(2)>Gtm(3)>Gtm(4)>Gtm(5) is satisfied.

The C/T 30 comprises a well-known structure and is configured in such a manner that the C/T 30 can break (or shut) and provide (or realize, form) a power transmission path between the output shaft A1 of the E/G 10 and the input shaft A2 of the T/M 20. In the vehicle, a clutch pedal is not provided. A state of the C/T 30 is controlled only by an actuator 31. When the C/T 30 is in a connection state, the output shaft A1 of the E/G 10 and the input shaft A2 of the T/M 20 rotate at the same rotational speed.

The M/G 40 comprises a well-known structure (e.g., an AC synchronous motor), and is configured in such a manner that the a rotor 41 rotates integrally with an output shaft A4 which is provided coaxially with and is rotatably movable relative to the input shaft A2 of the T/M 20. The M/G 40 functions as the power source as well as the electric power generator.

Figure 5:
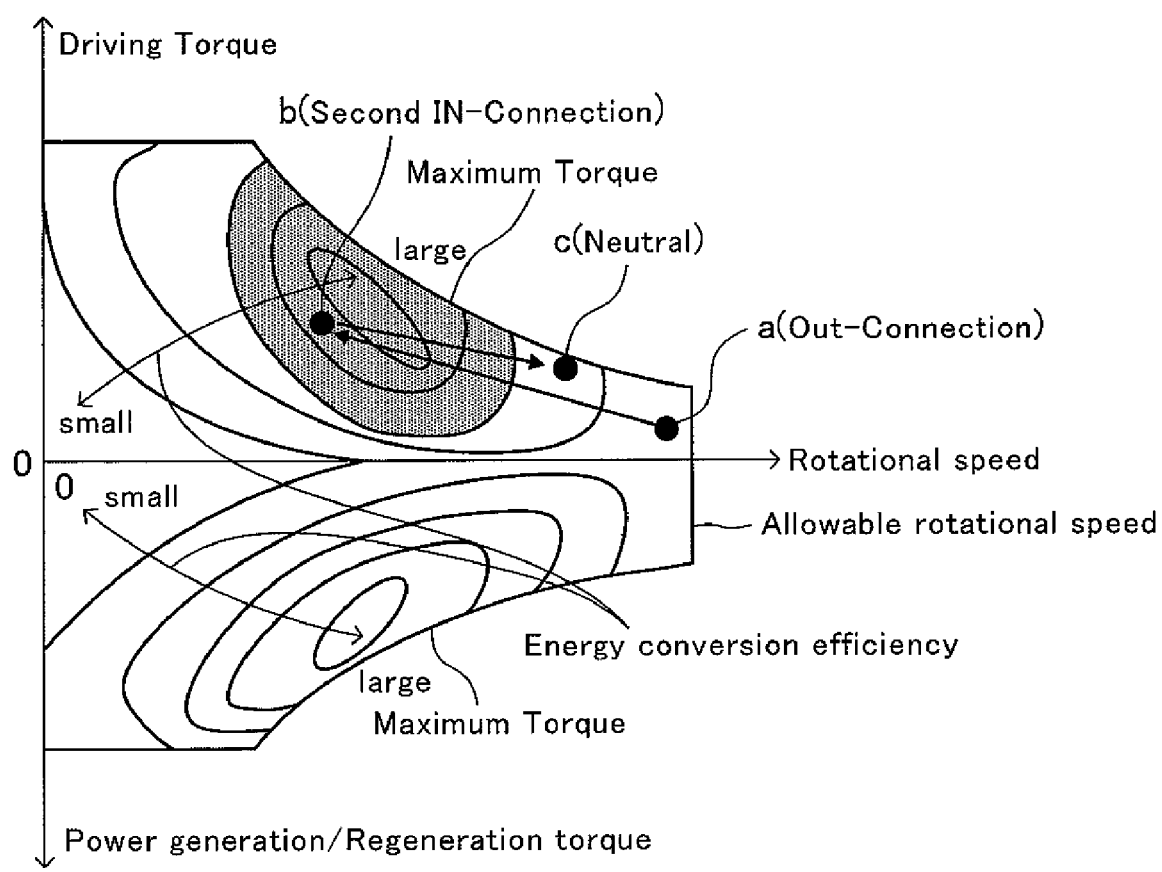
FIG. 5 is a graph showing a relation among a rotational speed, a maximum torque, and an energy conversion efficiency, of the motor generator shown in FIG. 1.

FIG. 5 shows a relation among the rotational speed of the output shaft A4 of the M/G 40, a maximum torque which the M/G 40 can generate, and the energy conversion efficiency (torque generating efficiency). As shown in FIG. 5, the maximum torque which the M/G 40 can generate is constant when the rotational speed of the output shaft A4 is smaller than a certain value, and decreases as the rotational speed increases when the rotational speed is larger than the certain value. Further, the M/G 40 does not generate any torque when the rotational speed is larger than an allowable rotational speed. In addition, the energy conversion efficiency (torque generating efficiency) can become the largest when the rotational speed of the output shaft A4 is at another certain value, and becomes smaller as an absolute value of a difference between the rotational speed and the another certain value becomes larger. That is, the energy conversion efficiency decreases as the rotational speed comes closer to the allowable rotational speed.

The changeover mechanism 50 is a mechanism which changes (over) a connection state of the output shaft A4 of the M/G 40. The changeover mechanism 50 comprises a connection piece 51 which rotates integrally with the rotor 41, a connection piece 52 which rotates integrally with the input shaft A2 of the T/M 20, a connection piece 53 axially supported by and rotatably movable relative to the input shaft A2, a sleeve 54, and an actuator 55. Further, the changeover mechanism 50 comprises a gear Go1 which rotates integrally with the connection piece 53 and is axially supported by and rotatably movable relative to the input shaft A2, and a gear Go2 which rotates integrally with the output shaft A3 of the T/M 20 and always meshes with the gear Go1.

The sleeve 54 is provided so as to be movable in the axial direction of the input shaft A2 of the T/M 20. A position of the sleeve 54 along the axial direction is controlled by the actuator 55. The sleeve 54 is able to spline-engage with the connection pieces 51, 52, and 53.

Figure 6:
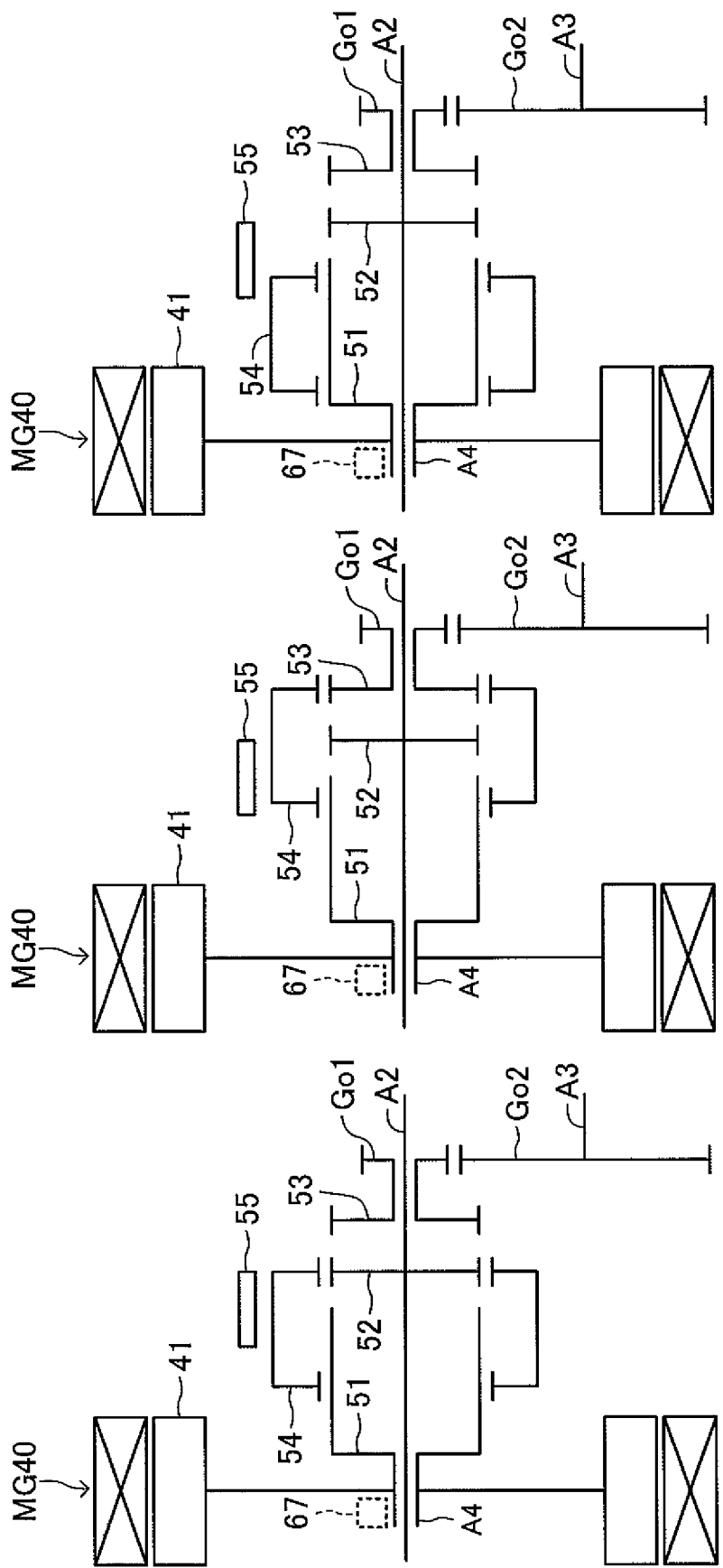
FIG. 6A is a schematic view showing one of three states which the changeover mechanism shown in FIG. 1 can realize.
FIG. 6B is a schematic view showing one of three states which the changeover mechanism shown in FIG. 1 can realize.
FIG. 6C is a schematic view showing one of three states which the changeover mechanism shown in FIG. 1 can realize.

When the sleeve 54 is controlled to an IN-Connection position shown in FIG. 6A, the sleeve 54 spline-engages with the connection pieces 51 and 52. Accordingly, the output shaft A4 of the M/G 40 and the input shaft A2 of the T/M 20 become rotatably immovable to each other. This provides/realizes a power transmission path between the input shaft A2 of the T/M 20 and the output shaft A4 of the M/G 40. This state is referred to as an "IN-Connection State".

In the IN-Connection State, a ratio of a rotational speed of the output shaft A4 of the M/G 40 to a rotational speed of the input shaft A2 of the T/M 20 is referred to as a "first reduction ratio G1", and a product (G1·Gtm) of the first reduction ratio G1 and the transmission reduction ratio Gtm is referred to as an "IN-connection reduction ratio Gin". In the present example, G1=1, and therefore Gin=Gtm. That is, the IN-connection reduction ratio Gin varies in accordance with the gear position of the T/M 20.

When the sleeve 54 is controlled to an OUT-Connection position shown in FIG. 6B, the sleeve 54 spline-engages with the connection pieces 51 and 53. Accordingly, the output shaft A4 of the M/G 40 and the gear Got become rotatably immovable to each other. This provides/realizes a power transmission path between the output shaft A3 of the T/M 20 and the output shaft A4 of the M/G 40 through the gear Go1 and the gear Go2, without involving the T/M 20. This state is referred to as an "OUT-Connection State".

In the OUT-Connection State, a ratio of a rotational speed of the output shaft A4 of the M/G 40 to a rotational speed of the output shaft A3 of the T/M 20 is referred to as an "OUT-connection reduction ratio Gout". In the present example, the OUT-connection reduction ratio Gout is equal to (the number of teeth of the gear Go2)/(the number of teeth of the gear Go1) and thus is constant. That is, the OUT-connection reduction ratio Gout does not vary in accordance with a change in the gear position of the T/M 20. In the present example, the OUT-connection reduction ratio Gout is set at a value which is roughly equal to the Gtm(2), for example.

When the sleeve 54 is controlled to a non-connection position (neutral position) shown in FIG. 6C, the sleeve 54 spline-engages only with the connection piece 51. Accordingly, both the input shaft A2 and the gear Go1 are rotatably movable relative to the output shaft A4. Accordingly, neither a power transmission path between the output shaft A3 of the T/M 20 and the output shaft A4 nor a power transmission path between the input shaft A2 of the T/M 20 and the output shaft A4 is provided. This state is referred to as a "non-connection state (neutral state)".

As described above, the changeover mechanism 50 selectively changes the connection state of the output shaft A4 of the M/G 40 into one of "the IN-Connection State", "the OUT-Connection State", and "the neutral connection state".

As shown in FIG. 1, a gear Gf1 is axially supported by and rotatably immovable relative to the output shaft A3 of the T/M 20. The gear Gf1 always meshes with a gear Gf2. The gear Gf2 is connected with a differential mechanism D/F comprising one of well-known configurations. The differential mechanism D/F is connected a pair of drive wheels including a left drive wheel and a right drive wheel. It should be noted that the (the number of teeth of the gear Gf2)/(the number of teeth of the gear Gf1) corresponds to a so-called final reduction ratio.

The present apparatus further comprises a wheel speed sensor 61 which detects a wheel speed of the drive wheels, an acceleration pedal opening degree sensor 62 which detects an operation amount of an acceleration pedal AP, a shift position sensor 63 which detects a position of a shift lever SF, a M/G torque sensor 68 which detects a torque of the output shaft A4 of the M/G 40, and an E/G torque sensor 69 which detects a torque of the output shaft A1 of the E/G 10

The present apparatus further comprises an electronic control unit ECU 70. The ECU 70 controls the actuators 24, 25, 26, 31, and 55, based on information and so on from the sensors 61-63, 68 and 69 to thereby control the gear position of the T/M 20 and the state of the C/T 30. Further, the ECU 70 controls the output (driving torque) of each of the E/G 10 and M/G 40, and so on.

The gear position of the T/M 20 is controlled based on a vehicle speed V obtained from the wheel speed sensor 61, a required driving torque T calculated based on the operation amount of the acceleration pedal AP obtained from the acceleration pedal opening degree sensor 62, and the shift lever position SF obtained from the shift position sensor 63. When the shift lever position SF is at a position corresponding to a "manual mode", the gear position of the T/M 20 is basically set at a gear position selected by the driver who operates the shift lever SF. On the other hand, when the shift lever position SF is at a position corresponding to an "automatic mode", the gear position of the T/M 20 is automatically controlled to one of the 1st to the 5th gear positions in accordance with "a combination of the vehicle speed V and the required driving torque T" and "the Map" shown in FIG. 7, even when the shift lever SF is not operated.

Figure 7:
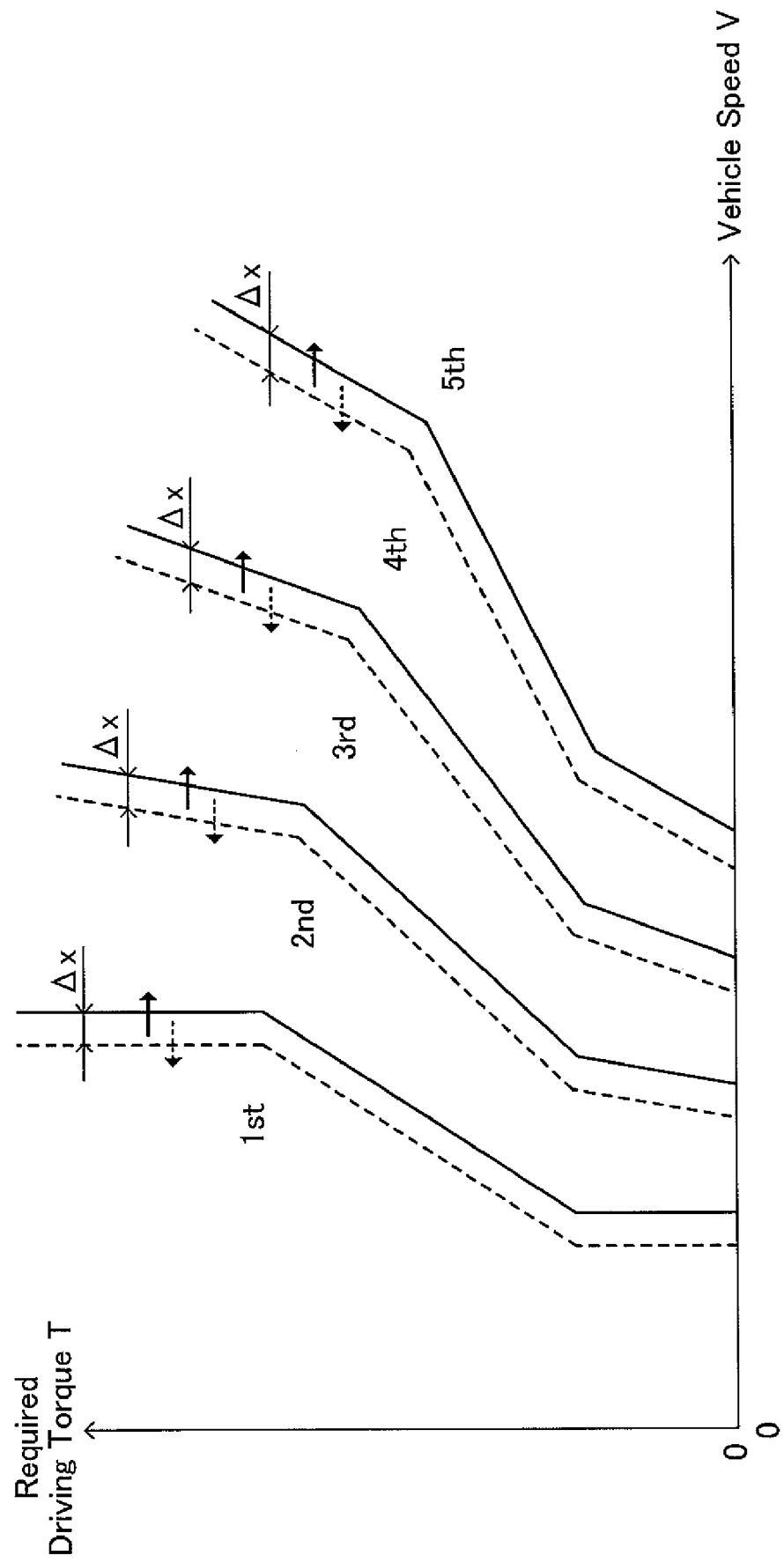
FIG. 7 is a graph showing a relation among a vehicle speed and a required driving torque as well as a gear position of the transmission to be selected, in the embodiment shown in FIG. 1.

In FIG. 7, each of the solid lines shows each of boundary lines which causes a shift up (a shift up operation, or a gear position change operation to decrease the transmission reduction ratio Gtm) with an increase in the vehicle speed V, and each of the dashed lines shows each of boundary lines which causes a shift down (a shift down operation, or a gear position change operation to increase the transmission reduction ratio Gtm) with a decrease in the vehicle speed V. The reason why a difference Δx is provided between the each solid line and the each dashed line as shown is to suppress an occurrence of a case (so-called hunting) in which the shift up and the shift down are performed frequently even though they are not necessary, when the vehicle speed V fluctuates (increases and decreases) around each of the values corresponding the solid lines.

A state of the C/T 30 is generally kept at the connection state, and is temporarily changed from the connection state to the non-connection state during the shift up operation and the shift down operation, and so on.

The M/G 40 is used as a driving power source generating a driving torque for driving the vehicle together with the E/G 10 or by itself, or is used as a power source for starting the E/G 10. Further, the M/G 40 is used as an electric motor generator for generating a regeneration torque to provide a breaking force to the vehicle, or is used as an electric motor generator for generating an electric power which is supplied to and stored in a battery (not shown) of the vehicle.

When the M/G 40 is used as the driving power source for driving the vehicle, a distribution between the output (driving torque) of the E/G 10 and the output (driving torque) of the M/G 40 is adjusted in such a manner that a sum of the driving torque transmitted to the drive wheels based on the output of the E/G 10 and the driving torque transmitted to the drive wheels based on the output of the M/G 40 coincides with the required driving torque T, according to one of well-known methods.

(Selection of the Connection State of the Output Shaft A4 of the M/G 40)

Next will be described how to select the (a target) connection state of the output shaft A4 of the M/G 40. The connection state of the output shaft A4 of the M/G 40 is automatically selected in accordance with "a combination of the vehicle speed V and the required driving torque T" and the map shown in FIG. 8.

Figure 8:
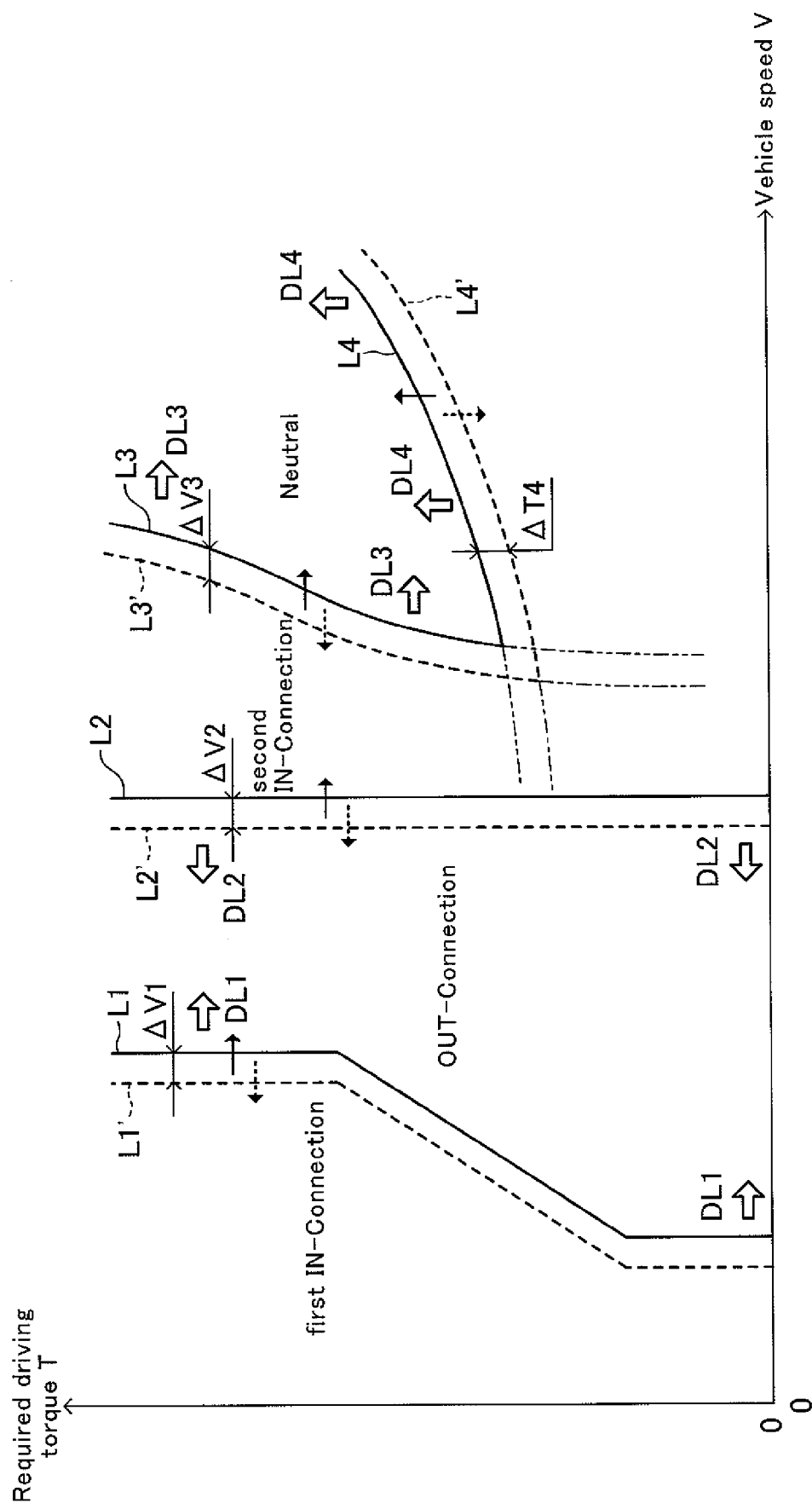
FIG. 8 is a graph showing a relation among the vehicle speed and the required driving torque as well as a connection state to be selected in the changeover mechanism, in the embodiment shown in FIG. 1.

As shown in FIG. 8, four areas (or regions) are defined with respect to "the combination of the vehicle speed V and the required driving torque T", i.e., a first IN-Connection area, an OUT-Connection area, a second IN-Connection area, and a neutral area (non-connection area). In the first and second IN-Connection areas, "the In-Connection State" is selected. In the OUT-Connection area, "the OUT-Connection State" is selected. In the neutral area, "the neutral-connection state (non-connection state)" is selected. Hereinafter, "the IN-Connection States" corresponding to the first IN-Connection area and the second IN-Connection area are referred separately to as "a first IN-Connection State" and "a second IN-Connection State", respectively.

A changeover from "the first IN-Connection State" to "the OUT-Connection State" is carried out, when the vehicle speed V passes through/over the boundary line L1 (corresponding to "the first threshold" described above) while the vehicle speed V is increasing. A changeover from "the OUT-Connection State" to "the second IN-Connection State" is carried out, when the vehicle speed V passes through/over the boundary line L2 (corresponding to "the second threshold" described above) while the vehicle speed V is increasing. A changeover from "the second IN-Connection State" to "the neutral state" is carried out, (1) when the vehicle speed V passes through/over the boundary line L3 (corresponding to "the third threshold" described above) while the vehicle speed V is increasing in a case where the required driving torque T is larger than the boundary line L4 (corresponding to "the fourth threshold" described above), or (2) when the required driving torque T passes through/over the boundary line L4 while the required driving torque T is increasing in a case where the vehicle speed V is larger than the boundary line L3.

In the meantime, a changeover from "the OUT-Connection State" to "the first IN-Connection State" is carried out, when the vehicle speed V passes through/over the boundary line L1' while the vehicle speed V is decreasing. A changeover from "the second IN-Connection State" to "the OUT-Connection State" is carried out, when the vehicle speed V passes through/over the boundary line L2' while the vehicle speed V is decreasing. A changeover from "the neutral state" to "the second IN-Connection State" is carried out, (1) when the vehicle speed V passes through/over the boundary line L3' while the vehicle speed V is decreasing, or (2) when the required driving torque T passes through/over the boundary line L4' while the required driving torque is decreasing.

The reason why differences ΔV1, ΔV2, ΔV3, and ΔT4 between the boundary lines L1 and L1', between the boundary lines L2 and L2', between the boundary lines L3 and L3', and between the boundary lines L4 and L4', respectively, are provided is to suppress an occurrence of a case (so-called hunting) in which the changeover of the connection state of the output shaft A4 are performed frequently, when the vehicle speed V fluctuates (increases and decreases) around each of the boundary lines L1, L2, and L3 or when the required driving torque T fluctuates (increases and decreases) around the boundary lines L4.

The boundary line L1 (low speed area) is set at a vehicle speed slightly smaller than a vehicle speed corresponding to the shift up from the 1st gear position to the 2nd gear position. That is, the boundary line L1 is provided at a location obtained by slightly shifting (moving) the boundary line (the solid line) corresponding to the shift up from the 1st gear position to the 2nd gear position shown in FIG. 7 in a direction (leftward direction in the figure) in which the vehicle speed V decreases. Accordingly, the boundary line L1 shown in FIG. 8 has the same shape as "the boundary line (the solid line) shown in FIG. 7" corresponding to the shift up from the 1st gear position to the 2nd gear position.

The boundary line L2 (middle speed area) is set at a vehicle speed obtained when the rotational speed of the output shaft A4 of the M/G 40 in "the OUT-Connection State" coincides with a value (e.g. a value slightly smaller than the allowable rotational speed) determined based on the allowable rotational speed (refer to FIG. 5). Further, in the present example, the boundary line L2 is located in a region corresponding to the 3rd gear position to the 5th gear position shown in FIG. 7. As described above, the OUT-connection reduction ratio Gout is constant (e.g., a ratio roughly equal to the Gtm(2) in the present example) irrespective of the gear position of the T/M 20. Accordingly, in the OUT-Connection State, a vehicle speed at which the rotational speed of the output shaft A4 of the M/G 40 coincides with "the above described value determined based on the allowable rotational speed" is determined as a single value, irrespective of the gear position of the T/M 20. Therefore, the vehicle speed V corresponding to the boundary line L2 shown in FIG. 8 is constant irrespective of the required driving torque T. That is, the boundary line L2 becomes a line extending in a vertical direction in FIG. 8. The vehicle speed V corresponding to the boundary line L2 is determined based on "the OUT-connection reduction ratio" and "the final reduction ratio" described above.

The boundary line L3 (high speed area) is set at a vehicle speed obtained when the energy conversion efficiency (in the driving torque side) of the M/G 40 in "the (second) IN-Connection State" coincides with a boundary (especially at the side where the vehicle speed is larger, or the rightward side in the figure) defining an area (refer to an area where fine dots are provided in FIG. 5) in which the energy conversion efficiency of the M/G 40 is larger than or equal to a predetermined value (e.g., 70%).

The boundary line L4 is determined based on a torque of the drive wheels with respect to the running resistance of the vehicle (the total sum of the frictional resistance of each of the various rotational members included in a driving system, the resistance to decelerate the vehicle due to a wind generated with the running of the vehicle, and the resistance to decelerate the vehicle due to an inclination of a road, and so on). Hereinafter, the torque of the drive wheels with respect to the running resistance of the vehicle is referred to as a "running resistance torque". The running resistance torque corresponds to the running-resistance-correlating-value described above. A calculation of the running resistance torque will be described later. When the running resistance torque is equal to the driving torque of the drive wheels, the acceleration (front-rear acceleration) of the vehicle in the front-rear direction of the vehicle becomes zero. When the driving torque of the drive wheels is larger (or smaller) than the running resistance torque, the front-rear acceleration becomes positive (or negative). Accordingly, the boundary line L4 is set at, for example, a driving torque which makes the front-rear acceleration coincide with a predetermined value (for example, zero, a positive slight value, or a negative slight value). That is, the boundary line L4 may be determined/set based on the front-rear acceleration of the vehicle or a parameter (for example, a change rate in the vehicle speed, a change rate in the rotational speed of the engine) correlating with the front-rear acceleration of the vehicle.

The running resistance torque increases as the vehicle speed increases. Accordingly, as shown in FIG. 8, the boundary L4 increases as the vehicle speed increases. In addition, the running resistance torque becomes larger as the upward inclination of the road becomes larger. Therefore, the boundary line L4 shifts more upwardly as the upward inclination of the road becomes larger. When the required driving torque T is larger than a value corresponding to the boundary line L4, the condition of the vehicle is in an acceleration condition. When the required driving torque T is smaller than the value corresponding to the boundary line L4, the condition of the vehicle is in a deceleration condition.

Next will be described advantages obtained by selecting the connection state of the output shaft A4 of the M/G 40 as shown in FIG. 8. Notably, it is assumed that the OUT-connection reduction ratio Gout is roughly equal to the Gtm(2), for example and just for description convenience First, the function/effect realized by "a feature that "the (first) In-Connection State" is selected after the vehicle starts to drive when the vehicle speed V is zero" is described. Generally, when the vehicle starts to drive, the gear position of the T/M 20 is set at the 1st gear position, and the IN-connection reduction ratio Gin (=Gtm(1)) is therefore larger than the OUT-connection reduction ratio Gout. Accordingly, the driving torque, which is transmitted to the drive wheels and which is based on the output of the M/G 40, can be made larger, compared to a case where the OUT-Connection State is selected. Consequently, a large driving torque at the drive wheels can be generated when the vehicle starts to drive.

Next, the function/effect realized by "a feature that the boundary line L1 is set at the vehicle speed slightly smaller than the vehicle speed corresponding to the shift up from the 1st gear position to the 2nd gear position" is described. When the vehicle speed passes through/over the boundary line L1 (low speed area) while the vehicle speed is increasing under the "the (first) In-Connection State" after the start of the vehicle, the changeover from the "the (first) In-Connection State" to "the OUT-Connection State" is carried out. This changeover occurs before the shift up from the 1st gear position to the 2nd gear position is carried out. In other words, the shift up from the 1st gear position to the 2nd gear position is carried out under "the OUT-Connection State" after the changeover to the OUT-Connection State is completed. As described in the summary of the present invention, the "OUT-Connection State" allows the driving torque of the M/G 40 to be continuously transmitted to the output shaft A3 of the T/M 20 (and therefore to the drive wheels) even during the gear position shifting operation by the T/M 20, and the shift shock can therefore be suppressed. Especially, a severe shift shock tends to occur when the gear position is changed from the 1st gear position to the 2nd gear position, since the change amount in the transmission reduction ratio Gtm is large. In view of the above, it is possible to remarkably moderate the shift shock which occurs when the gear position is changed from the 1st gear position to the 2nd gear position by the feature described above.

Next will be described the function/effect realized by "a feature that the boundary line L2 is set at the vehicle speed obtained when the rotational speed of the output shaft A4 in "the OUT-Connection State" coincides with the value determined based on the allowable rotational speed". When the vehicle speed passes through/over the boundary line L2 while the vehicle speed is increasing under "the OUT-Connection State", the changeover from the "OUT-Connection State" to "the (second) IN-Connection State" is carried out. As described above, the boundary line L2 is located in the region corresponding to the 3rd gear position to 5th gear position shown in FIG. 7. Accordingly, this changeover occurs while one of the 3rd, 4th, and 5th gear positions (i.e., the gear positions higher than or equal to the 3rd gear position) is selected. That is, this changeover occurs while the IN-connection reduction ratio Gin (=one of Gtm(3), Gtm(4), and Gtm(5)) is smaller than the OUT-connection reduction ratio Gout. Accordingly, this changeover allows the rotational speed of the output shaft A4 of the M/G 40 to decrease from a value close to the allowable rotational speed (refer to a movement from a point "a" to a point "b" in FIG. 5). As a result, the rotational speed of the output shaft A4 can be retained smaller than the allowable control rotational speed.

Next will be described a function/effect realized by "a feature that the boundary line L3 is set at the vehicle speed obtained when the energy conversion efficiency of the M/G 40 under "the (second) IN-Connection State" coincides with the boundary defining the area in which the energy conversion efficiency of the M/G 40 under "the (second) IN-Connection State" is larger than or equal to the predetermined value". When the vehicle speed passes through/over the boundary line L3 while the vehicle speed is increasing under "the (second) IN-Connection State" and under a condition where the required driving torque T is larger than the boundary line L4 (i.e., when the vehicle is in the acceleration condition), the changeover from "the (second) IN-Connection State" to "the non-connection state" is carried out. Consequently, driving the M/G 40 is stopped, and a driving torque equal to the required driving torque T is generated only by the E/G 10. A timing at which the vehicle speed passes through/over the boundary line L3 while the vehicle speed is increasing (i.e., while the rotational speed of the output shaft A4 of the M/G 40 is increasing) means a timing at which the energy conversion efficiency of the M/G 40 passes through/over a part of the boundary defining the area in which the fine dots are provided in FIG. 5, the part being at a higher vehicle speed side (rightward side in FIG. 5) (refer to a movement from a point "b" to a point "c" in FIG. 5). That is, when a state of the M/G 40 has changed from a state in which the energy conversion efficiency is larger than or equal to the predetermined value to a state in which the energy conversion efficiency is smaller than the predetermined value, the changeover from "the second IN-Connection State" to "the non-connection state" is carried out. In the meantime, an energy generation efficiency of the E/G 10 is generally high in the high speed area where the energy conversion efficiency of the M/G 40 is low in most cases. In this state, the total energy efficiency (fuel consumption) of the vehicles as a whole can be more improved by having only the E/G 10 generate the driving torque equal to the required driving torque T than by having both the M/G 40 and the E/G 10 cooperatively generate the driving torque equal to the required driving torque T. In view of the above, the total energy efficiency (fuel consumption) of the vehicles as a whole can be improved in a case in which the vehicle is in the acceleration condition and the energy conversion efficiency of the M/G 40 in the high speed area under "the (second) IN-Connection State" is lower than the predetermined value.

Next will be described a function/effect realized by the feature described above that "the boundary L4 is set at the predetermined value obtained when the front-rear acceleration coincides with the predetermined value (for example, zero, a positive slight value, or a negative slight value)". In a case where the vehicle is in the acceleration condition, it is preferable that, as described above, the changeover from "the (second) IN-Connection State" to "the non-connection state" be carried out when the vehicle speed passes through/over the boundary line L3 while the vehicle speed is increasing, in order to improve the energy conversion efficiency (fuel consumption) of the vehicle as a whole. To the contrary, in a case where the vehicle is in the deceleration condition (that is, the required driving torque T is smaller than the boundary line L4), it is possible to supply an electric power to the battery to store the power in the battery, the electric power being generated by a regeneration by having the M/G 40 generate the regeneration torque by retaining "the (second) IN-Connection State". That is, in this case, selecting "the (second) IN-Connection State" instead of "the non-connection state" can more improve the total energy efficiency (fuel consumption) of the vehicle as a whole. In view of the above, in the case where the vehicle is in the deceleration condition, "the (second) IN-Connection State" is preferably retained even though the vehicle speed is larger than the value corresponding to the boundary line L3.

(Adjusting the Connection State Based on the Running Resistance Torque)

Generally, as for a motion of the vehicle, a motion equation shown by an equation (1) below is satisfied. In the equation (1), Te is a driving torque generated by the E/G 10 transmitted to the drive wheels (which becomes positive when the driving torque is a torque to accelerate the vehicle), Tm is a driving torque generated by the M/G 40 transmitted to the drive wheels (which becomes positive when the driving torque is a torque to accelerate the vehicle), Tr is the running resistance torque described above (which becomes positive when the running resistance torque is a torque to decelerate the vehicle), M is a mass of the vehicle, a is an acceleration of the vehicle (in the front-rear direction) (which becomes positive when the vehicle is accelerating), and R is a radius of a tire.

$$(Te+Tm-Tr)/R = M \cdot a \quad (1)$$

From the equation (1) above, an equation (2) below is obtained to calculate the running torque Tr.

$$Tr = (Te+Tm) - (M \cdot a) \cdot R \quad (2)$$

The present apparatus obtains the running resistance torque Tr by using the equation (2) above. Te is obtained by multiplying "the torque of the output shaft A1 of the E/G 10 which is obtained form the output of the E/G torque sensor 69" by a product of "the transmission reduction ratio Gtm" and "the final reduction ratio". Tm is obtained by multiplying "the torque of the output shaft A4 of the M/G 40 which is obtained form the output of the M/G torque sensor 68" by a product of "a current reduction ratio" and "the final reduction ratio", the current reduction ratio being a ratio corresponding to the current connection state among "the IN-connection reduction ratio" and the "OUT-connection reduction ratio. α can be obtained by differentiating the vehicle speed calculated based on the output of the wheel speed sensor 61 with respect to time, or a can be obtained from the output of a sensor (not shown) which detects the acceleration of the vehicle in the front-rear direction of the vehicle.

The running resistance torque Tr can be obtained based on the inclination (upward-downward) of the road (and optionally the current vehicle speed). The inclination of the road can be obtained based on, for example, road-information provided by a car navigation system mounted on the vehicle and a current position of the vehicle obtained from a global positioning system mounted on the vehicle. Alternatively, the inclination of the road can be calculated by processing an image of the road which a camera mounted on the vehicle provides. It should be noted that the positive (or negative) running resistance torque Tr means that the vehicle is receiving a force in a deceleration (or acceleration) direction.

In the present apparatus, shift amounts DL1-DL4 shown in FIG. 8 are determined in accordance with the running resistance torque Tr. As shown in FIG. 8, when the DL1 is positive, positions of the boundary lines L1 and L1' are shifted from the reference (original) positions shown in FIG. 8 by the DL1 in a direction (rightward direction in FIG. 8, a direction of vehicle speed V increase) along which the vehicle speed V increases. When the DL1 is negative, the positions of the boundary lines L1 and L1' are shifted from the reference (original) positions shown in FIG. 8 by an absolute value of DL1 (=|DL1|) in a direction (leftward direction in FIG. 8, a direction of vehicle speed V decrease) along which the vehicle speed V decreases. When the DL2 is positive, positions of the boundary lines L2 and L2' are shifted from the reference (original) positions shown in FIG. 8 by the DL2 in the direction along which the vehicle speed V decreases. When the DL2 is negative, the positions of the boundary lines L2 and 2' are shifted from the reference (original) positions shown in FIG. 8 by an absolute value of DL2 (=|DL2|) in the direction along which the vehicle speed V increases. When the DL3 is positive, positions of the boundary lines L3 and L3' are shifted from the reference (original) positions shown in FIG. 8 by the DL3 in the direction along which the vehicle speed V increases. When the DL3 is negative, the positions of the boundary lines L3 and 3' are shifted from the reference (original) positions shown in FIG. 8 by an absolute value of DL3 (=|DL3|) in the direction along which the vehicle speed V decreases. When the DL4 is positive, positions of the boundary lines L4 and L4' are shifted from the reference (original) positions shown in FIG. 8 by the DL4 in a direction (upward direction in FIG. 8, a direction of required driving torque increase) along which the required driving torque T increases. When the DL4 is negative, the positions of the boundary lines L4 and L4' are shifted from the reference (original) positions shown in FIG. 8 by an absolute value of DL4 (=|DL4|) in a direction (downward direction in FIG. 8, a direction of required driving torque decrease) along which the required driving torque T decreases. Hereinafter, the shift amounts DL1-DL4 may also be expressed as and represented by "DL*".

Figure 9:
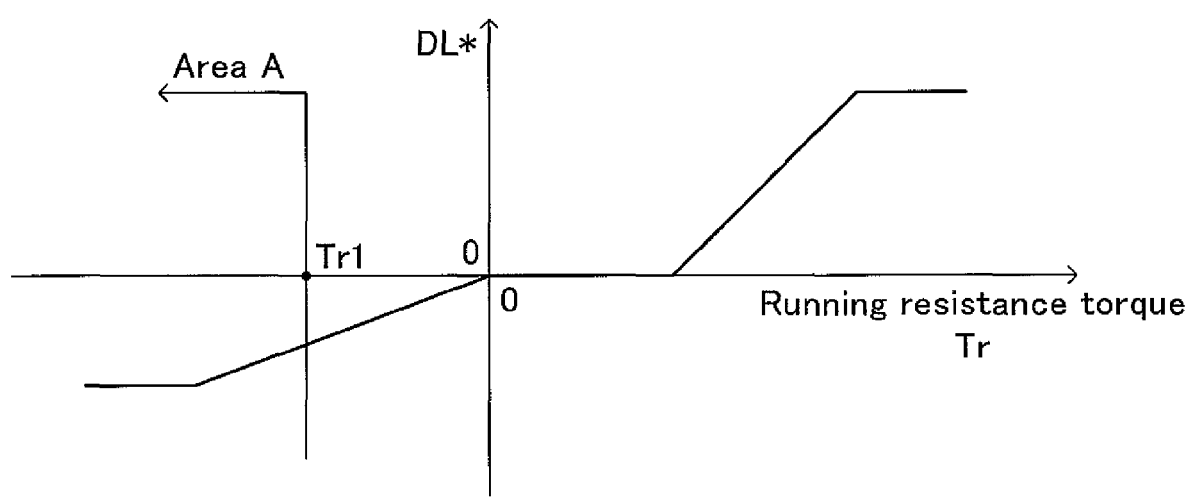
FIG. 9 is a graph showing a relation between a running resistance and a shifting amount of a boundary line, in the embodiment shown in FIG. 1.

FIG. 9 shows a map defining a relation between the running resistance torque Tr and the shift amount DL*. As shown in FIG. 9, the shift amount DL* is 0 (i.e., the reference positions) within a range where the Tr is between 0 and a predetermined positive value. The shift amount DL* increases from 0 (i.e., positive) as the Tr increases when the Tr is larger than the above predetermined positive value. The shift amount DL* decreases from 0 (i.e., negative) as the Tr decreases when the Tr is smaller than 0. The shift amount DL* may be set when the Tr is smaller than 0 in such a manner that the shift amount DL* is 0 when the Tr is between a predetermined negative value and 0, and the shift amount DL* decreases from 0 as the Tr decreases when the Tr is smaller than the predetermined negative value. The predetermined positive value and the predetermined negative value may be 0. The shift amounts DL1-DL4 may be the same values, each varying depending on the running resistance torque Tr, or may be different values, each varying depending on the running resistance torque Tr.

Accordingly, it is understood from FIG. 8 that, in the present apparatus, as the running resistance torque Tr becomes larger, the first and second IN-Connection areas are expanded (enlarged), and the OUT-Connection areas and the neutral area are narrowed (becomes smaller). That is, a possibility that the first and second IN-Connection States are selected becomes higher, as the running resistance torque Tr becomes larger. In other words, the first and second IN-Connection States are selected more frequently (i.e., an ease by which the first and second IN-Connection States are selected is increased), as the running resistance torque Tr becomes larger.

Here, a value obtained by multiplying the maximum driving torque (refer to FIG. 5) of the output shaft A4 of the M/G 40 with respect to the rotational speed of the output shaft A4 of the M/G 40 under "the IN-Connection State" by "the IN-connection reduction ratio Gin" is referred to as an "IN-connection maximum driving torque". Further, a value obtained by multiplying the maximum driving torque (refer to FIG. 5) of the output shaft A4 of the M/G 40 with respect to the rotational speed of the output shaft A4 of the M/G 40 under "the OUT-Connection State" by "the OUT-connection reduction ratio Gout" is referred to as an "OUT-connection maximum driving torque".

In the present apparatus, a maximum torque characteristic (refer to FIG. 5) with respect to the rotational speed of the M/G 40 and the various reduction ratios are designed in such a manner that,
(1) "the IN-connection maximum driving torque" is larger than "the OUT-connection maximum driving torque" at the changeover between "the (first) IN-Connection State" and "the OUT-Connection State", and
(2) "the OUT-connection maximum driving torque" is larger than "the IN-connection maximum driving torque" at the changeover between "the OUT-Connection State" and "the (second) IN-Connection State".

It should be noted that "the IN-connection maximum driving torque" and "the OUT-connection maximum driving torque" correspond to a maximum driving torque (the electric-motor-driving-wheels-maximum-torque) of the M/G 40 transmitted to the output shaft A3 of the T/M 20 under "the IN-Connection State" and "the OUT-Connection State", respectively.

Next will be described a function/effect realized by the feature described above. When the vehicle is accelerated, a driving force supplied to the drive wheels in order to obtain a certain acceleration becomes larger, as the running resistance torque Tr becomes larger. Accordingly, when the vehicle is accelerated, it is preferable that the electric-motor-driving-wheels-maximum-torque be larger as the running resistance torque Tr is larger. The electric-motor-driving-wheels-maximum-torque varies depending on the connection state of the output shaft A4 of the electric motor.

As described above, in the present apparatus, the shift amounts DL1 and DL2 become larger as the running resistance torque Tr becomes larger. Accordingly, during the vehicle speed V is increasing, a timing at which the changeover (shifting) from "the (first) IN-Connection State" to "the OUT-Connection State" is carried out is more delayed as the running resistance torque Tr becomes larger, and a timing at which the changeover (shifting) from "the OUT-Connection State" to "the (second) IN-Connection State" is carried out is more delayed as the running resistance torque Tr becomes larger. In the meantime, a condition of "the IN-connection maximum driving torque">"the OUT-connection maximum driving torque" is satisfied at the changeover between "the (first) IN-Connection State" and "the OUT-Connection State", and a condition of "the OUT-connection maximum driving torque"<"the IN-connection maximum driving torque" is satisfied at the changeover between "the OUT-Connection State" and "the (second) IN-Connection State". Accordingly, a time period becomes longer in which "the first IN-Connection State and second IN-Connection State" are selected, as the running resistance torque Tr becomes larger. In addition, the electric-motor-driving-wheels-maximum-torque under the first IN-Connection State is larger than under the OUT-Connection State, and the electric-motor-driving-wheels-maximum-torque under the second IN-Connection State is larger than under the OUT-Connection State. As a result, the vehicle is thereby accelerated more efficiently/effectively, when the running resistance torque Tr is large.

Further, in the present apparatus, the shift amounts DL3 and DL4 become larger as the running resistance torque Tr becomes larger. Accordingly, during the vehicle speed V is increasing, a timing at which the changeover (shifting) from "the (second) IN-Connection State" to "the neutral connection state (non-connection state)" is carried out is more delayed as the running resistance torque Tr becomes larger. In addition, during the required driving torque T is increasing, a timing at which the changeover (shifting) from "the (second) IN-Connection State" to "the neutral connection state" is carried out is more delayed as the running resistance torque Tr becomes larger. On the other hand, the electric-motor-driving-wheels-maximum-torque is maintained at 0 under "the neutral connection state", and the electric-motor-driving-wheels-maximum-torque under "the (second) IN-Connection State" is therefore larger under "the neutral connection state". Accordingly, a time period become longer in which "the (second) IN-Connection State" is selected, as the running resistance torque Tr becomes larger. The electric-motordriving-wheels-maximum-torque under the (second) IN-Connection-State" is larger under "the neutral connection state". As a result, the vehicle is thereby accelerated more efficiently, when the running resistance torque Tr is large.

As described above, the vehicular power transmission control apparatus according to the embodiment of the present invention is applied to the vehicle comprising, as power sources, the E/G 10 and the M/G 40, and further comprising the so-called automated manual transmission utilizing the T/M 20 which does not comprise a torque convertor. The apparatus comprises the changeover mechanism 50 which can select, as the connection state of the output shaft A4 of the M/G 40, one connection state from "the IN-Connection State", "the OUT-Connection State", and "the non-connection state", the IN-Connection State being the state in which the power transmission path between the input shaft A2 of the T/M 20 and the output shaft A4 of the M/G 40 is provided/made/realized, the OUT-Connection State being the state in which the power transmission path between the output shaft A3 of the T/M 20 and the output shaft A4 of the M/G 40 is provided/made/realized, and the non-connection state being the state in which no power transmission path among these shafts is provided/made/realized. The selection for the connection state is made based on the combination (area) of the vehicle speed V and the required driving torque T. As for the changeovers, as the running resistance torque Tr becomes larger, the first and second IN-connection-areas are made larger in which the electric-motor-driving-wheels-maximum-torque is larger compared to "the OUT-connection area" and "the neutral area (NON-connection area)". That is, the time period in which "the first and second IN-Connection States" are selected becomes longer. As a result, the apparatus can accelerate the vehicle more efficiently.

The present invention is not limited to the embodiment described above, but may be modified as appropriate without departing from the scope of the invention. For example, the so-called automated manual transmission which uses the multiple gear ratio transmission but which does not include a torque converter is used as the transmission, however, a multiple gear ratio transmission or a continuously variable transmission (a so-called automatic transmission (AT)) may be used as the transmission, each including a torque convertor and automatically performing an operation for a gear position change in accordance with the vehicle driving condition. In this case, the C/T 30 is omitted.

Further, a transmission (a so-called manual transmission (MT)) may be used as the transmission, the manual transmission being a multiple gear ratio transmission without the torque converter, performing an operation for a gear position change directly (without using an actuator) by an operation of a link mechanism caused by an operating force supplied to the shift lever from the driver.

Further, in the embodiment described above, the changeover mechanism 50 is configured so as to be able to select any one from "the IN-Connection State", "the OUT-Connection State", and "the non-connection state (the neutral state)", however, the changeover mechanism 50 may be configured so as to be able to select any one from "the IN-Connection State and the OUT-Connection State" only. In this case, the boundary lines L3, L3', L4 and L4' shown in FIG. 8 are omitted so that the neutral area in FIG. 8 is united/merged into the (second) IN-Connection area. Furthermore, the changeover mechanism 50 may be configured so as to be able to select any one from "the IN-Connection State and non-connection state (the neutral state)" only. In this case, the boundary lines L1, L1', L2, and L2' shown in FIG. 8 are omitted so that the OUT connection area in FIG. 8, the first IN connection area in FIG. 8, and the second IN connection area in FIG. 8 are united/merged into a single IN-Connection area. Moreover, the changeover mechanism 50 may be configured so as to be able to select any one from "the OUT-Connection State and non-connection state (the neutral state)" only. In this case, the boundary lines L1, L1', L2, and L2' shown in FIG. 8 are omitted so that the first IN connection area in FIG. 8 and the second IN connection area in FIG. 8 are united/merged into the OUT-Connection area.

Further, in the embodiment described above, the connection state of the output shaft A4 of the M/G 40 is selected/determined based on the combination of the vehicle speed V and the required driving torque T (refer to FIG. 8), but the connection state of the output shaft A4 of the M/G 40 may be selected/determined based on a combination of "any one from the vehicle speed V, the rotational speed of the output shaft A1 of the E/G 10, the rotational speed of the input shaft A2 of the T/M 20, and the rotational speed of the output shaft A4 of the M/G 40" and "any one from the required driving torque T, the operation amount of the acceleration pedal AP, and the opening degree of a throttle valve (not shown) disposed in an intake passage of the E/G 10". The opening degree of the throttle valve may be obtained from a throttle valve opening degree sensor 64. The rotational speed of the output shaft A1 of the E/G 10, the rotational speed of the input shaft A2 of the T/M 20, and the rotational speed of the output shaft A4 of the M/G 40 may be obtained from a rotational speed of the engine output shaft sensor 65, a rotational speed of the transmission input shaft sensor 66, and a rotational speed of the electric motor output shaft sensor 67, respectively.

Further, in the embodiment described above, the positions of the boundary lines L1-L4 are shifted/changed based on the running resistance torque Tr, however, the positions of the boundary lines L1-L4 may be shifted/changed based on a running resistance force (i.e., a value obtained by dividing the Tr by the radius R of a tire of the driving wheel).

Further, in the embodiment described above, the positions of the boundary lines L1-L4 are shifted/changed based on the running resistance torque Tr, however, the positions of the boundary lines L1 and L2 only may be shifted/changed. Furthermore, only one out of the positions of the boundary lines L1-L4 may be shifted.

Further, in the embodiment described above, the shift amount DL* of the positions of the boundary lines L1-L4 are set in such a manner that the shift amount DL* (refer to FIG. 9) varies gradually in accordance with the running resistance torque Tr, however, the shift amount DL* may be set in such a manner that the shift amount DL* changes in a stepwise fashion (with a single step, two steps or more) in accordance with the running resistance torque Tr.

Further, the embodiment described above is configured in such a manner that it obtains the boundary lines L1-L4 from the single map (refer to FIG. 8) and it changes/shifts the positions of the obtained boundary lines L1-L4, when changing the positions of the boundary lines L1-L4 based on the running resistance torque Tr. To the contrary, the embodiment described above may be configured in such a manner that it stores maps, each corresponding to FIG. 8, for different running resistance torques Tr (a plurality of maps, each defining the positions of the boundary lines L1-L4, and the positions of the boundary lines L1-L4 in one of the maps is different from those in another of the maps), it selects one of the maps which corresponds to the current running resistance torque Tr, and it selects the connection state of the output shaft A4 of the M/G 40 based on the boundary lines L1-L4 obtained from the selected map.

Further, the embodiment described above is configured in such a manner that the condition of "the IN-connection maximum driving torque">"the OUT-connection maximum driving torque" is satisfied at the changeover between "the (first) IN-Connection State" and "the OUT-Connection State", and (the position of) the boundary line L1 is shifted by the larger positive amount along the direction of vehicle speed V increase (rightward direction in FIG. 8), as the running resistance torque Tr becomes larger. To the contrary, the apparatus may be configured in such a manner that a condition of "the IN-connection maximum driving torque"<"the OUT-connection maximum driving torque" is satisfied at the changeover between "the (first) IN-Connection State" and "the OUT-Connection State", and (the position of) the boundary line L1 is shifted by a larger positive amount along the direction of vehicle speed V decrease (leftward direction in FIG. 8), as the running resistance torque Tr becomes larger.

Similarly, the embodiment described above is configured in such a manner that the condition of "the OUT-connection maximum driving torque"<"the IN-connection maximum driving torque" is satisfied at the changeover between "the OUT-Connection State" and "the (second) IN-Connection State", and (the position of) the boundary line L2 is shifted by the larger positive amount along the direction of vehicle speed V decrease (leftward direction in FIG. 8), as the running resistance torque Tr becomes larger. To the contrary, the apparatus may be configured in such a manner that a condition of "the OUT-connection maximum driving torque">"the IN-connection maximum driving torque" is satisfied at the changeover between "the OUT-Connection State" and "the (second) IN-Connection State", and (the position of) the boundary line L2 is shifted by a larger positive amount along the direction of vehicle speed V increase (rightward direction in FIG. 8), as the running resistance torque Tr becomes larger.

Further, in the embodiment described above, the positions of the boundary lines L1-L4 are shifted in parallel (i.e., the boundary lines L1-L4 are shifted in such a manner that a slope of each of the boundary lines L1-L4 with respect to the coordinate axes remains unchanged), however, the positions of the boundary lines L1-L4 may be shifted in a different fashion from the parallel-shift (i.e., the boundary lines L1-L4 may be shifted in such a manner that a slope of each of the boundary lines L1-L4 with respect to the coordinate axes does not remain the same).

What is claimed is:

1. A vehicular power transmission control apparatus applied to a vehicle comprising an internal combustion engine and an electric motor as power sources, comprising:
  a transmission including an input shaft to provide a power transmission path between said input shaft of said transmission and an output shaft of said internal combustion engine, and an output shaft to provide a power transmission path between said output shaft of said transmission and drive wheels of said vehicle, wherein said transmission is capable of adjusting a transmission reduction ratio which is a ratio of a rotational speed of said input shaft of said transmission to a rotational speed of said output shaft of said transmission;
  a changeover mechanism which is capable of changing a connection state of an output shaft of said electric motor to any one from two or more states including,
    an input-side-connection state in which a power transmission path is provided between said output shaft of said electric motor and said input shaft of said transmission,
    an output-side-connection state in which a power transmission path is provided between said output shaft of said electric motor and said drive wheels without involving said transmission, and
    a non-connection state in which neither a power transmission path between said output shaft of said electric motor and said input shaft of said transmission, nor a power transmission path between said output shaft of said electric motor and said output shaft of said transmission is provided;
  running-resistance-correlating-value obtaining means for obtaining a running-resistance-correlating-value correlating with a running resistance which is a resistance to decelerate said vehicle caused by a running of said vehicle; and
  control means for selecting a connection state of said output shaft of said electric motor based on said running-resistance-correlating-value and a parameter indicative of a running condition of said vehicle other than said running-resistance-correlating-value, in such a manner that a possibility of selecting a connection state, in which a maximum value of a driving torque which can be transmitted from said electric motor to said output shaft of said transmission is greater, becomes higher as said running resistance is larger, and for controlling said changeover means in such a manner that an actual connection state of said output shaft of said electric motor coincides with said selected connection state.

2. A vehicular power transmission control apparatus according to claim 1, wherein a product of a first reduction ratio and said transmission reduction ratio is defined as an input-side-connection reduction ratio, said first reduction ratio being a ratio of a rotational speed of said output shaft of said electric motor to said rotational speed of said input shaft of said transmission under said input-side-connection state, and a ratio of said rotational speed of said output shaft of said electric motor to said rotational speed of said output shaft of said transmission under said output-side-connection state is defined as an output-side-connection reduction ratio, and wherein
  said control means is configured so as to:
    change said actual connection state of said output shaft of said electric motor from said input-side-connection state to said output-side-connection state, when a value correlating with a speed of said vehicle as said parameter passes over a threshold while said value is increasing; and
    adjust, as for said change from said input-side-connection state to said output-side-connection state, said threshold in such a manner that said threshold becomes larger as said running resistance is larger, in a case where an input-side-connection maximum driving torque is configured so as to be larger than an output-side-connection maximum driving torque, said input-side-connection maximum driving torque being a value obtained by multiplying a maximum driving torque of said output shaft of said electric motor with respect to said rotational speed of said electric motor under said input-side-connection state by said input-side-connection reduction ratio, and said output-side-connection maximum driving torque being a value obtained by multiplying a maximum driving torque of said output shaft of said electric motor with respect to said rotational speed of said electric motor under said output-side-connection state by said output-side-connection reduction ratio, or
    adjust, as for said change from said input-side-connection state to said output-side-connection state, said threshold in such a manner that said threshold becomes smaller as said running resistance is larger in a case where said input-side-connection maximum driving torque is configured so as to be smaller than said output-side-connection maximum driving torque.

3. A vehicular power transmission control apparatus according to claim 1, wherein a product of a first reduction ratio and said transmission reduction ratio is defined as an input-side-connection reduction ratio, said first reduction ratio being a ratio of a rotational speed of said output shaft of said electric motor to said rotational speed of said input shaft of said transmission under said input-side-connection state, and a ratio of said rotational speed of said output shaft of said electric motor to said rotational speed of said output shaft of said transmission under said output-side-connection state is defined as an output-side-connection reduction ratio, and wherein said control means is configured so as to:
  change said actual connection state of said output shaft of said electric motor from said output-side-connection state to said input-side-connection state, when a value correlating with a speed of said vehicle as said parameter passes over a threshold while said value is increasing; and
  adjust, as for said change from said output-side-connection state to said input-side-connection state, said threshold in such a manner that said threshold becomes smaller as said running resistance is larger, in a case where an output-side-connection maximum driving torque is configured so as to be smaller than an input-side-connection maximum driving torque, said input-side-connection maximum driving torque being a value obtained by multiplying a maximum driving torque of said output shaft of said electric motor with respect to said rotational speed of said electric motor under said input-side-connection state by said input-side-connection reduction ratio, and said output-side-connection maximum driving torque being a value obtained by multiplying a maximum driving torque of said output shaft of said electric motor with respect to said rotational speed of said electric motor under said output-side-connection state by said output-side-connection reduction ratio, or
  adjust, as for said change from said output-side-connection state to said input-side-connection state, said threshold in such a manner that said threshold becomes larger as said running resistance is larger in a case where said output-side-connection maximum driving torque is configured so as to be larger than said input-side-connection maximum driving torque.

4. A vehicular power transmission control apparatus according to claim 1, wherein said control means is configured so as to:
  change said actual connection state of said output shaft of said electric motor from either one of said input-side-connection state and said output-side-connection state to said non-connection state, when said value correlating said speed of said vehicle as said parameter passes over a threshold while said value correlating said speed of said vehicle is increasing; and
  adjust said threshold in such a manner that said threshold becomes larger as said running resistance is larger.

5. A vehicular power transmission control apparatus according to claim 1, wherein said control means is configured so as to
  change said actual connection state of said output shaft of said electric motor from either one of said input-side-connection state and said output-side-connection state to said non-connection state, when said value correlating with a required driving torque as said parameter passes over a threshold while said value correlating with a required driving torque is increasing, said value correlating with a required driving torque being a value obtained based on an operation applied to an acceleration operating member by a driver of said vehicle; and
  adjust said threshold in such a manner that said threshold becomes larger as said running resistance is larger.

6. A vehicular power transmission control apparatus according to claim 1, wherein a product of a first reduction ratio and said transmission reduction ratio is defined as an input-side-connection reduction ratio, said first reduction ratio being a ratio of a rotational speed of said output shaft of said electric motor to said rotational speed of said input shaft of said transmission under said input-side-connection state, and a ratio of said rotational speed of said output shaft of said electric motor to said rotational speed of said output shaft of said transmission under said output-side-connection state is defined as an output-side-connection reduction ratio, and wherein said control means is configured so as to:
  select, as said actual connection state of said output shaft of said electric motor, said input-side-connection state when said vehicle stars to drive;
  change said actual connection state of said output shaft of said electric motor from said input-side-connection state to said output-side-connection state, when said value correlating said speed of said vehicle as said parameter passes over a first threshold while said value is increasing, an input-side-connection maximum driving torque is configured so as to be larger than an output-side-connection maximum driving torque when changing from said input-side-connection state to said output-side-connection state, said input-side-connection maximum driving torque being a value obtained by multiplying a maximum driving torque of said output shaft of said electric motor with respect to said rotational speed of said electric motor under said input-side-connection state by said input-side-connection reduction ratio, and said output-side-connection maximum driving torque being a value obtained by multiplying a maximum driving torque of said output shaft of said electric motor with respect to said rotational speed of said electric motor under said output-side-connection state by said output-side-connection reduction ratio
  change said actual connection state of said output shaft of said electric motor from said output-side-connection state to said input-side-connection state, when said value correlating said speed of said vehicle passes over a second threshold larger than said first threshold while said value correlating said speed of said vehicle is increasing, said output-side-connection maximum driving torque is configured so as to be smaller than said input-side-connection maximum driving torque when changing from said output-side-connection state to said input-side-connection state;
  change said actual connection state of said output shaft of said electric motor from said input-side-connection state to said non-connection state, when said value correlating said speed of said vehicle passes over a third threshold larger than said second threshold while said value correlating said speed of said vehicle is increasing in a period in which a value correlating with a required driving torque as said parameter is larger than a fourth threshold, said value correlating with a required driving torque being a value obtained based on an operation applied to an acceleration operating member by a driver of said vehicle, or when said value correlating said required driving torque passes over said fourth threshold while said value correlating said required driving torque is increasing in a period in which said value correlating said speed of said vehicle is larger than said third threshold; and adjust said first threshold and said second threshold in such a manner that said first threshold becomes larger and said second threshold becomes smaller, as said running resistance is larger.

7. A vehicular power transmission control apparatus according to claim 6, wherein said control means is configured so as to adjust at least one of said third threshold or said fourth threshold in such a manner that said third threshold becomes larger as said running resistance is larger and said fourth threshold becomes larger as said running resistance is larger.

8. A vehicular power transmission control apparatus according to claim 1, wherein said running-resistance-correlating-value obtaining means is configured so as to obtain said running-resistance-correlating-value based on:

a driving torque of said internal combustion engine, transmitted to said drive wheels of said vehicle;

a driving torque of said electric motor, transmitted to said drive wheels of said vehicle;

a mass of said vehicle;

an acceleration of said vehicle; and a motion equation for said vehicle, which expresses that a force in a direction of acceleration of said vehicle given to said vehicle is equal to a product of said mass of said vehicle and said acceleration of said vehicle.

9. A vehicular power transmission control apparatus according to claim 1, wherein said running-resistance-correlating-value obtaining means is configured so as to obtain said running-resistance-correlating-value based on an inclination of a road on which said vehicle is running.

10. A vehicular power transmission control apparatus according to claim 1, comprising a clutch mechanism, disposed between said output shaft of said internal combustion engine and said input shaft of said transmission, for shutting and providing a power transmission path between said output shaft of said internal combustion engine and said input shaft of said transmission, and wherein, said transmission is a multiple gear ratio transmission which does not comprise a torque converter and which can realize each of a plurality of predetermined reduction ratios different from one another as said transmission reduction ratio, and said control means is configured so as to control, based on a driving condition of said vehicle, shutting and providing of said power transmission path by said clutch mechanism, and so as to control said transmission reduction ratio.

* * * * *